United States Patent
Arai

(10) Patent No.: US 7,107,601 B2
(45) Date of Patent: Sep. 12, 2006

(54) FOAM MOLDING METHOD AND APPARATUS

(75) Inventor: Takashi Arai, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1025 days.

(21) Appl. No.: 09/877,092

(22) Filed: Jun. 11, 2001

(65) Prior Publication Data

US 2002/0014709 A1 Feb. 7, 2002

(30) Foreign Application Priority Data

| Jun. 14, 2000 | (JP) | ............................. 2000-178222 |
| Jun. 14, 2000 | (JP) | ............................. 2000-178296 |
| Jun. 14, 2000 | (JP) | ............................. 2000-178297 |

(51) Int. Cl.
*G11B 45/00* (2006.01)

(52) U.S. Cl. ..................................... 720/651
(58) Field of Classification Search ................ 720/651
See application file for complete search history.

(56) References Cited

U.S. PATENT DOCUMENTS

| 3,268,639 A | 8/1966 | Taft | 264/78 |
| 3,384,691 A | 5/1968 | Weissman et al. | 264/47 |
| 3,796,779 A | 3/1974 | Greenberg | 264/50 |
| 4,360,484 A | 11/1982 | Rubens | 264/28 |
| 4,473,665 A | 9/1984 | Martini-Vvedensky et al. | 521/79 |
| 5,158,986 A | 10/1992 | Cha et al. | 521/82 |
| 5,160,674 A | 11/1992 | Colton et al. | 264/50 |
| 5,334,356 A | 8/1994 | Baldwin et al. | 422/133 |
| 5,571,848 A * | 11/1996 | Mortensen et al. | 521/61 |
| 5,866,053 A * | 2/1999 | Park et al. | 264/50 |
| 5,997,781 A | 12/1999 | Nishikawa et al. | 264/45.1 |
| 6,172,786 B1 | 1/2001 | Fujita et al. | 359/200 |
| 2002/0080712 A1* | 6/2002 | Feist et al. | 369/272 |
| 2003/0004256 A1* | 1/2003 | Ogasawara et al. | 524/495 |

FOREIGN PATENT DOCUMENTS

| EP | 0662 383 A1 | 7/1995 |
| JP | 49-111615 | 10/1974 |
| JP | 52-28657 B | 7/1977 |
| JP | 54-128728 | 10/1979 |

(Continued)

*Primary Examiner*—A. J. Heinz
*Assistant Examiner*—Mark Blouin
(74) *Attorney, Agent, or Firm*—Fitzpatrick, Cella, Harper & Scinto

(57) ABSTRACT

According to this invention, there is provided a molding method and apparatus which increase the gas permeation speed in obtaining a foamed resin molded product by letting a gas permeate a molten resin material. To achieve this object, a chip- or pellet-like resin material is evacuated and subjected to dehumidifying/drying processing, and replacement processing in an inert gas in a pre-processing unit, the resin material is then held in an inert gas of a predetermined temperature and pressure in an inert gas permeation unit for a predetermined period of time, the temperature and pressure are decreased, the material is fed to a material hopper whose temperature and pressure are controlled, the material is fed to a plasticizing unit to which a gas of a predetermined temperature and pressure is fed, the resin material is melted in the plasticizing unit, the resin material is injected/charged into a mold which is evacuated in advance to a pressure not more than atmospheric pressure, the pressure is restored to atmospheric pressure after the resin material is cooled for a predetermined period of time, and a foamed product is extracted by opening the mold.

9 Claims, 35 Drawing Sheets

FOREIGN PATENT DOCUMENTS

| | | |
|---|---|---|
| JP | 60-47796 | 10/1985 |
| JP | 2-43260 | 2/1990 |
| JP | 5-318541 | 12/1993 |
| JP | 6-506724 | 7/1994 |
| JP | 7-232358 | 9/1995 |
| JP | 8-300392 | 11/1996 |
| JP | 9-48039 | 2/1997 |
| JP | 10-24436 | 1/1998 |
| JP | 10-230528 | 9/1998 |
| JP | 11-7180 | 1/1999 |
| JP | 11-84296 | 3/1999 |
| JP | 2000-25066 | 1/2000 |

* cited by examiner

FIG. 9

| | INJECTION TIME sec | HOLDING PRESSURE TIME sec | COOLING TIME sec METERING TIME sec | MOLD OPENING /CLOSING EXTRACTION TIME sec | MOLDING CYCLE sec |
|---|---|---|---|---|---|
| GENERAL MOLDING *WITHOUT FORMING | 2 | 4 | 10 | 10 | 26 |
| | | | 6 | | |
| CONVENTIONAL FOAM MOLDING | 2.5 | 0 | 7 | 10 | 32.5 |
| | | | 20 | | |
| FORM MOLDING ACCORDING TO PRESENT INVENTION | 0.8 | 0 | 6 | 10 | 16.8 |
| | | | 5 | | |

FIG. 10

| FILLING TIME sec | INJECTION PROCESS AMBIENT PRESSURE IN CAVITY BEFORE FILLING | DURING INJECTION / CHARGE | | | |
|---|---|---|---|---|---|
| | | NEAR GATE | | NEAR FINALLY FILLED PORTION | |
| | | INTERNAL PRESSURE Mpa | CELL DIAMETER μm | INTERNAL PRESSURE Mpa | CELL DIAMETER μm |
| 0.5 | VACUUM 0.0001 Mpa | 60 | 9 | 54 | 13 |
| 1 | VACUUM 0.0001 Mpa | 62 | 10 | 49 | 15 |
| 2 | ATMOSPHERIC PRESSURE | 63 | 22 | 14 | 75 |
| 3 | GAS FILLING 2 Mpa | 62 | 23 | 9 | 120 |

F I G. 11A

| | | CONDITION 1 | CONDITION 2 | CONDITION 3 | CONDITION 4 | CONDITION 5 |
|---|---|---|---|---|---|---|
| | RESIN MATERIAL | PC/ABS | PC | PPE+PS | ABS | HIPS |
| DEHUMIDIFIER / DRYER UNIT | TIME (MIN) | 120 | 240 | 120 | 120 | 120 |
| | REPLACEMENT GAS | $CO_2$ GAS | $CO_2$ GAS | $CO_2$ GAS | $CO_2$ GAS | $CO_2$ GAS |
| | TEMPERATURE (°C) | 90 | 120 | 90 | 80 | 70 |
| GAS PERMEATION UNIT | TIME (MIN) | 480 | 480 | 480 | 480 | 360 |
| | REPLACEMENT GAS | $CO_2$ GAS | $CO_2$ GAS | $CO_2$ GAS | $CO_2$ GAS | $CO_2$ GAS |
| | TEMPERATURE (°C) | 90 | 110 | 90 | 80 | 70 |
| | PRESSURE (Mpa) | 6 | 6 | 6 | 6 | 5 |
| MATERIAL HOPPER | TIME (MIN) | 180 | 180 | 180 | 180 | 120 |
| | REPLACEMENT GAS | $CO_2$ GAS | $CO_2$ GAS | $CO_2$ GAS | $CO_2$ GAS | $CO_2$ GAS |
| | TEMPERATURE (°C) | 90 | 110 | 90 | 80 | 70 |
| | PRESSURE (Mpa) | 6 | 6 | 6 | 6 | 6 |
| METERING PORTION | REPLACEMENT GAS | $CO_2$ GAS | $CO_2$ GAS | $CO_2$ GAS | $CO_2$ GAS | $CO_2$ GAS |
| | TEMPERATURE (°C) | 60 | 60 | 60 | 50 | 40 |
| | PRESSURE (Mpa) | 4 | 4 | 4 | 4 | 4 |
| PLASTICIZING UNIT | BACK PRESSURE (Mpa) | 10 | 10 | 10 | 8 | 8 |
| | NOZZLE TEMPERATURE (°C) | 220 | 260 | 260 | 200 | 160 |
| | PLASTICIZING UNIT TEMPERATURE (°C) | 210 | 250 | 250 | 190 | 150 |
| | TEMPERATURE BELOW HOPPER (°C) | 60 | 60 | 60 | 50 | 40 |
| | INJECTION PRESSURE (Mpa) | 120 | 140 | 150 | 110 | 120 |
| | INJECTION SPEED (m/sec) | 2 | 2 | 2 | 3 | 4 |
| | INJECTION TIME (sec) | 0.8 | 0.8 | 0.8 | 0.6 | 0.4 |
| | HOLDING PRESSURE (Mpa) | 60 | 70 | 70 | 55 | 45 |
| | HOLDING PRESSURE TIME (sec) | 2.5 | 2 | 2 | 2.5 | 3 |
| | COOLING TIME (sec) | 8 | 7 | 6 | 8 | 10 |
| | MOLDING CYCLE (sec) | 25 | 23.5 | 22.5 | 24.8 | 27.1 |
| DEGREE OF VACUUM | PRESSURE (Pa) | 200 | 150 | 200 | 100 | 100 |
| MOLDED PRODUCT | PART WEIGHT (g) | 246 | 255 | 268 | 221 | 215 |
| | AVERAGE CELL DIAMETER (μm) | 16 | 9 | 19 | 16 | 8 |
| | FOAMING RATIO (%) | 18 | 20 | 17 | 21 | 24 |

$CO_2$ GAS ··· CARBON DIOXIDE GAS

* "TIME" IN "MATERIAL HOPPER" INDICATES THE TIME BETWEEN THE INSTANT AT WHICH A MATERIAL IS FED INTO THE HOPPER AND THE INSTANT AT WHICH THE MATERIAL IS FED INTO THE PLASTICIZING UNIT
* "FOAMING RATIO" IN "MOLDED PRODUCT" INDICATES THE RATIO OF WEIGHT REDUCTION OF FOAMED MOLDED PRODUCT TO THAT OF MOLDED PRODUCT WITHOUT FOAMING

FIG. 11B

| | | CONDITION 6 | CONDITION 7 | CONDITION 8 | CONDITION 9 | CONDITION 10 | CONDITION 11 |
|---|---|---|---|---|---|---|---|
| | RESIN MATERIAL | PC/ABS | PPE+PS | ABS | HIPS | PPS | PC |
| DEHUMIDIFIER / DRYER UNIT | TIME (MIN) | 120 | 120 | 120 | 120 | 240 | 240 |
| | REPLACEMENT GAS | N₂ GAS | N₂ GAS | N₂ GAS | N₂ GAS | N₂ GAS | N₂ GAS |
| | TEMPERATURE (°C) | 70 | 70 | 60 | 50 | 80 | 70 |
| GAS PERMEATION UNIT | TIME (MIN) | 60 | 60 | 45 | 30 | 60 | 60 |
| | REPLACEMENT GAS | N₂ GAS | N₂ GAS | N₂ GAS | N₂ GAS | N₂ GAS | N₂ GAS |
| | TEMPERATURE (°C) | 50 | 50 | 45 | 40 | 60 | 50 |
| | PRESSURE (Mpa) | 4 | 5 | 3 | 1 | 5 | 3 |
| MATERIAL HOPPER | TIME (MIN) | 30 | 30 | 30 | 30 | 30 | 30 |
| | REPLACEMENT GAS | N₂ GAS | N₂ GAS | N₂ GAS | N₂ GAS | N₂ GAS | N₂ GAS |
| | TEMPERATURE (°C) | 70 | 70 | 60 | 50 | 80 | 70 |
| | PRESSURE (Mpa) | 0.5 | 0.7 | 0.4 | 0.1 | 0.7 | 0.4 |
| METERING PORTION | REPLACEMENT GAS | N₂ GAS | N₂ GAS | N₂ GAS | N₂ GAS | N₂ GAS | N₂ GAS |
| | TEMPERATURE (°C) | 45 | 45 | 45 | 45 | 45 | 45 |
| | PRESSURE (Mpa) | 0.5 | 0.7 | 0.4 | 0.1 | 0.7 | 0.4 |
| PLASTICIZING UNIT | BACK PRESSURE (Mpa) | 2 | 2.5 | 1.5 | 1 | 2.5 | 1.5 |
| | NOZZLE TEMPERATURE (°C) | 220 | 260 | 200 | 160 | 270 | 260 |
| | PLASTICIZING UNIT TEMPERATURE (°C) | 210 | 250 | 190 | 150 | 260 | 250 |
| | TEMPERATURE BELOW HOPPER (°C) | 45 | 45 | 45 | 45 | 45 | 45 |
| | INJECTION PRESSURE (Mpa) | 100 | 110 | 100 | 90 | 120 | 110 |
| | INJECTION SPEED (m/sec) | 2 | 2 | 2.5 | 2.5 | 2 | 2 |
| | INJECTION TIME (sec) | 0.8 | 0.9 | 0.7 | 0.6 | 0.8 | 0.9 |
| | HOLDING PRESSURE (Mpa) | 0 | 0 | 0 | 0 | 0 | 0 |
| | HOLDING PRESSURE TIME (sec) | 0 | 0 | 0 | 0 | 0 | 0 |
| | COOLING TIME (sec) | 8 | 7 | 8 | 8 | 9 | 7 |
| | MOLDING CYCLE (sec) | 21 | 20 | 21 | 21 | 22 | 20 |
| DEGREE OF VACUUM | PRESSURE (Pa) | 80 | 90 | 80 | 80 | 90 | 80 |
| MOLDED PRODUCT | PART WEIGHT (g) | 251 | 270 | 231 | 224 | 277 | 261 |
| | AVERAGE CELL DIAMETER (μm) | 26 | 100 | 33 | 48 | 15 | 10 |
| | FOAMING RATIO (%) | 13 | 19 | 19 | 5 | 12 | 20 |

N₂ GAS ... NITROGEN GAS

* "TIME" IN "MATERIAL HOPPER" INDICATES THE TIME BETWEEN THE INSTANT AT WHICH A MATERIAL IS FED INTO THE HOPPER AND THE INSTANT AT WHICH THE MATERIAL IS FED INTO THE PLASTICIZING UNIT
* "FOAMING RATIO" IN "MOLDED PRODUCT" INDICATES THE RATIO OF WEIGHT REDUCTION OF FOAMED MOLDED PRODUCT TO THAT OF MOLDED PRODUCT WITHOUT FOAMING

F I G. 12

| | RESIN MATERIAL | GAS | MOLDED PRODUCT CELL SIZE | | | MECHANICAL CHARACTER-ISTICS | DIMENSIONAL PRECISION (WITH RESPECT TO REFERENCE SIZE OF 100 mm) | |
|---|---|---|---|---|---|---|---|---|
| | | | AVERAGE DIAMETER | MAXIMUM DIAMETER | MINIMUM DIAMETER | BENDING MODULUS | CONTRACTION VARIATION | DIMENSIONAL VARIATION |
| MOLDED PRODUCT ACCORDING TO PRESENT INVENTION | PPE+PS | $CO_2$ | 19μm | 25μm | 10μm | 4500Mpa | +−2% | +−0.05mm |
| CONVENTIONAL MOLDED PRODUCT | PPE+PS | $CO_2$ | 28μm | 120μm | 20μm | 1800Mpa | +−15% | +−0.3mm |
| MOLDED PRODUCT ACCORDING TO PRESENT INVENTION | PC/ABS | $N_2$ | 26μm | 35μm | 10μm | 22000Mpa | +−1.5% | +−0.04mm |
| CONVENTIONAL MOLDED PRODUCT | PC/ABS | $N_2$ | 35μm | 90μm | 18μm | 19000Mpa | +−6.0% | +−0.11mm |

FIG. 26

| RESIN MATERIAL | PPO | PPO | PC | POM | ABS | HIPS | PC/ABS | SI ELASTOMER | URETHANE ELASTOMER |
|---|---|---|---|---|---|---|---|---|---|
| CELL DIAMETER | 10 | 60 | | 20 | 50 | 75 | 15 | 60 | 100 |
| THICKNESS mm | 4 | 4 | 4 | 4 | 4 | 4 | 4 | 5 | 5 |
| WEIGHT REDUCTION % | 20 | 30 | 18 | 25 | 30 | 35 | 22 | 35 | 42 |

FIG. 27

| MATERIAL TYPE | CELL DIAMETER μm | THICKNESS mm | DAMPING FACTOR dB/sec |
|---|---|---|---|
| PPO | 60 | 4 | 62 |
| PC |  | 4 | 45 |
| ABS | 50 | 4 | 80 |
| HIPS | 75 | 4 | 90 |
| PC/ABS | 15 | 4 | 58 |
| SI ELASTOMER | 60 | 5 | 125 |
| URETHANE ELASTOMER | 100 | 5 | 134 |
| CONVENTIONAL PRODUCT | *** | *** | 24 |
| ALUMINUM ALLOY | *** | 1 | 6 |

F I G. 33

| RESIN MATERIAL | PPO1 | PPO2 | PC2 | ABS | HIPS | PC/ABS | PC/ABS GF35 | PPO GF25 MD10 | PPO GF25 MD10 | PPO3 | PC GF25 | PC GF35 |
|---|---|---|---|---|---|---|---|---|---|---|---|---|
| CELL DIAMETER | 10 | 20 | 15 | 20 | 15 | 15 | 25 | 25 | 25 | 45 | 18 | 35 |
| GAS TYPE | $CO_2$ | $CO_2$ | $CO_2$ | $CO_2$ | $CO_2$ | $CO_2$ | $CO_2$ | $CO_2$ | $N_2$ | $N_2$ | $N_2$ | $N_2$ |
| THICKNESS | 2.5 | 2.5 | 2.5 | 2.0 | 1.5 | 2.0 | 2.5 | 2.5 | 2.5 | 2.5 | 2.5 | 2.5 |
| WEIGHT REDUCTION | 20 | 25 | 25 | 20 | 15 | 22 | 24 | 28 | 18 | 12 | 9 | 14 |

CELL DIAMETER μm, THICKNESS mm, WEIGHT REDUCTION %
GF : GLASS FIBER
MD : MINERAL

F I G. 34

| MATERIAL TYPE | CELL DIAMETER μm | THICKNESS | DAMPING FACTOR dB/sec | FLEXURAL RIGIDITY 1 | FLEXURAL RIGIDITY 2 |
|---|---|---|---|---|---|
| PPO | 20 | 2.5 | 58 | — | 0.85 |
| PC | 15 | 2.5 | 75 | — | 0.95 |
| ABS | 20 | 2.0 | 88 | — | 0.7 |
| HIPS | 15 | 1.5 | 92 | — | 0.7 |
| PC/ABS | 15 | 2.0 | 82 | — | 0.75 |
| PC/ABS GF35% | 25 | 2.5 | 105 | 0.95 | — |
| PPO GF25% MD10% | 25 | 2.5 | 98 | 0.9 | — |
| CONVENTIONAL PRODUCT | — | 2.5 | 35 | 1.0 | 1.0 |
| ALUMINUM ALLOY | — | 1.0 | 10.5 | — | — |

FOAM MOLDING METHOD AND APPARATUS

FIELD OF THE INVENTION

The present invention relates to foam molding in which an inert gas such as carbon dioxide gas is used as a foaming agent and a resin is charged into a mold.

The present invention also relates to a resin molded product molded from a resin material.

The present invention further relates to a structural member manufactured from a resin material.

The present invention further relates to a resin molded product used for an audio/musical instrument using a compact disk (to be referred to as a CD hereinafter) and a resin molded product used for video equipment using a digital video disk (to be referred to as a DVD hereinafter), video tape, or the like.

The present invention further relates to an antivibration mechanism and antivibration member.

The present invention further relates to a screw fastening member suitable for an antivibration mechanism.

The present invention further relates to a method of processing an antivibration member.

The present invention further relates to a molded product and, more particularly, to a cellular molded product made of a resin material.

The present invention further relates to a molded product made of a resin material, which has an antivibration function.

The present invention further relates to a molded product on which a vibration source object and a reception object for receiving signals from the vibration source object are mounted to be flush with each other.

The present invention further relates to a mount member made of a resin material, on which a vibration source and a reception member for receiving signals from the vibration source are mounted.

The present invention further relates to a method of manufacturing the molded product and a method of manufacturing the mount member.

The present invention relates, in particular, to a molded product suited to transmitting accurate image information while eliminating the influence of vibrations from a vibration source, in office equipment such as a copying machine and laser printer, in the process of transmitting information from a means for creating image information to a means for transferring the image information.

BACKGROUND OF THE INVENTION

The history concerning foam molding is old; a technique of obtaining a foamed product made of a resin by injection molding is disclosed in, for example, U.S. Pat. No. 3,268,639 and U.S. Pat. No. 3,384,691. Recently, foam molding methods using chemical foaming agents and physical foaming agents can be learnt from textbooks for synthetic resin molding and the like. As is known from styrofoam and the like, conventional foam molding exhibits a very high foaming magnification, and hence has an advantage in terms of weight reduction but suffers low mechanical strength. In addition, many problems are posed in the use of chemical foaming agents in terms of toxicity, mold corrosion, molding environment degradation, difficulty in handling, and the like. In contrast to this, a foam is disclosed in U.S. Pat. No. 3,796,779, which is obtained by directly blowing an inert gas, e.g., carbon dioxide gas, into a molten resin material, letting the gas permeate the resin, and then cooling the resin. The use of an inert gas as a foaming agent solves the problems of toxicity, mold corrosion, molding environment degradation, difficulty in handling, and the like. According to U.S. Pat. No. 3,796,779, however, since the gas is directly blown into the molten resin, the resin and gas are not uniformly mixed to form island structures in various cell shapes. For example, the resultant structure partly decreases in strength. That is, it is very difficult to control a foamed state. To eliminate these drawbacks, a method of molding very small foams called microcells was invented in Massachusetts Institute of Technology in the U.S. early in the 1980s. This method and apparatus are disclosed in U.S. Pat. No. 4,473,665, U.S. Pat. No. 5,158,986, U.S. Pat. No. 5,160,674, U.S. Pat. No. 5,334,356, U.S. Pat. No. 5,571,848, and U.S. Pat. No. 5,866,053. According to the method and apparatus developed Massachusetts Institute of Technology, a supercritical inert gas is blown into a portion of the plasticizing unit of an injection molding machine in which a resin is molten, and the molten resin and gas are sufficiently mixed by a static mixer, while pressure and temperature control is performed. In the resultant foamed product, many small cells with sizes of 25 μm or less are uniformly dispersed. Since the cell diameters are small, a molded product that is almost free from a decrease in strength can be obtained. In addition, the following method is known. When a resin is to be injected into a mold, the mold is filled with a gas and pressurized with atmospheric pressure or more in advance, and the resin is injected. After the resin is completely charged into the mold, the gas pressure is released to cause gas foaming in the resin.

In the conventional method, since a gas is directly blown into a molten resin material, a molten resin portion that comes into contact with the gas is rapidly cooled when the gas is blown. If the gas is continuously blown into the resin, the molten resin is mostly cooled. As a consequence, the viscosity of the resin increases, and it takes much time to restore the resin temperature and viscosity that are suited to molding. In addition, when a gas is to be heated to a temperature near the melting temperature of the resin in advance, the volume of the gas increases with a rise in temperature. If, therefore, the gas is directly blown into the molten resin, since the gas pressure in the resin is low, the foaming magnification after the charge of the resin into the mold is excessively low. A method of compensating for this drawback is available, in which the temperature and pressure of a gas are raised to maintain the gas concentration, and the gas is then blown into a molten resin. In this case, however, the pressure of the gas is very high, and hence flows into a molten resin as soon as it is blown thereinto. This makes it difficult to control the amount of gas blown. In addition, since the gas is quickly blown into the molten resin, the resin into which the gas is blown is formed into a two-isolated-layer structure. To uniformly disperse the gas into the resin, the gas and resin must be repeatedly kneaded mechanically by a static mixer or the like. This complicates the apparatus and prolongs the cycle, resulting in a deterioration in productivity. The plasticizing unit of an injection molding machine or extrusion machine is configured to apply a certain pressure to a molten resin to purge air from a material or a material during metering. If, therefore, a gas is blown into a molten resin and metered as in the prior art, the gas is discharged to the metering portion side of the plasticizing unit before the blown gas completely dissolves in the resin. According to the method of filling a mold with a gas, applying a pressure equal to atmospheric pressure or more in injecting a resin into a mold, and then releasing the gas pressure after the resin is charged, if the filling speed is high, the pressure of the gas charged into the mold cannot be controlled. As a result, the charge gas causes a short shot. If the filling speed of a resin is decreased, the gas charged into the mold can be controlled, and the pressure of the gas during and after the charge of a resin can be controlled. Owing to the low filling speed, however, a large skin layer is formed, which solidifies when it comes into contact with the mold as the mold is cooled. For this reason, in the foaming distribution of the molded product, the foaming differences between the surface and the central portion in the direction of thickness and between a portion near the gate and the finally filled portion become vary large.

A technique associated with an audio equipment structure is disclosed in, for example, Japanese Patent Publication No. 60-47796.

The technique disclosed in this reference is associated with a structural member having a three-layer structure formed by a surface layer and core layer, which is formed by injection molding.

The technique disclosed in this reference is a technique of taking measures against the mechanical and audio vibration sources of audio equipment or vibrations from other sources.

As a technique of preventing resonance, a technique using a sandwich structure is disclosed in Japanese Patent Publication No. 52-28657.

When a resin molded product molded by a resin material is to be used as the above audio equipment or the housing structural member of video equipment, a foam molding technique is available as a technique for a reduction in the weight of the structural member and the problem of sink-marks formed on in a resin surface which is unique to resin molding. This technique is disclosed in, for example, U.S. Pat. No. 4,473,665, U.S. Pat. No. 4,360,484, and Japanese Patent Laid-Open Nos. 8-300392 and 10-24436.

In image forming apparatuses such as electrophotographic copying machines, laser beam printers, and facsimile apparatuses, other office equipment, industrial equipment, and the like, vibrations from vibration sources such as rotating members like motors and vibration generating members adversely affect the image forming step, and adverse effects on the information transmission step adversely affect image and information output results.

Information equipment such as a computer incorporates a cooling fan motor as a countermeasure against heat dissipation from electric and electronic elements.

In printers, particularly, laser printers which have remarkably become popular in the recent years owing to an increase in image resolution, the vibrations produced by motors for rotating/driving polygon mirrors greatly influence the resolution of images in apparatuses for transferring image information created by laser scanning to image carriers such as paper through information transfer means such as polygon mirrors, optical lenses, and the like.

The above parts and units such as a motor, optical lens, and laser source are held and incorporated on a mount member in an image forming apparatus.

In the prior art, the mount member is a metal member or a molded product made of a resin material. For example, according to the technique disclosed in Japanese Patent Laid-Open No. 7-232358, to position the respective parts to be held on the mount member, projections are formed on the flat surface of the mount member to specify the positions of the parts, and a resin material used for the projections is compressed to guarantee the dimensional precision of the respective projections.

As the above office equipment and information equipment are widely used as terminals in offices and homes, the personal use of equipment have proliferated. As a consequence, demands have arisen for reductions in weight and cost as well as size.

The mount member is preferably a molded product made of a resin material to fix/place the above motor, laser source, polygon mirror, optical lens, and the like at predetermined positions of the respective parts.

If a molded product made of a resin material is to be used as a mount member, consideration should be given to a reduction in weight. As a technique of reducing the weight of a resin molded member, a molding method of foaming a resin material is disclosed in U.S. Pat. 4,360,484, U.S. Pat. No. 4,473,665 and Japanese Patent Laid-Open No. 8-300392.

In addition, techniques associated with a product molded by foaming a resin material are disclosed in Japanese Patent Laid-Open Nos. 10-24436, 09-48039, and 12-25066.

SUMMARY OF THE INVENTION

The present invention has been made in consideration of the above problem, and has as its object to provide a molding method for a foamed product (molding product having gas cells) in which cells can be reduced in size.

It is another object of the present invention to provide a resin molded product which is molded from a resin material incorporated in audio equipment using various types of recording media, e.g., a tape, a compact disk, and a digital video disk or video equipment using the recording media and is suitable for the audio equipment or video equipment.

It is still another object of the present invention to provide a structural member suitably incorporated in the audio equipment or video equipment.

When the recording medium set in the audio equipment or video equipment is driven by a driving means such as a motor to play back audio information or video information, a dropout phenomenon or video disturbance phenomenon is caused by the vibrations generated by the driving means or external shocks. The present invention solves these problems.

During the playback of information recorded on the recording medium in the audio equipment or video equipment, the playback of information may be disturbed by vibrations or shocks outside the equipment. It is an object of the present invention to provide a resin molded product which solves this problem.

As a structural member to be incorporated in the audio equipment or video equipment, a structural member is provided to cope with a reduction in weight and the vibrations generated by the internal factors and the vibrations and shocks generated by external factors and improve the portability of the equipment.

According to the present invention, there is provided an antivibration mechanism and antivibration member which suitably provide antivibration effects to protect audio signals or video signals in the audio equipment or video equipment.

It is still another object of the present invention to provide a processing method suitable for an antivibration member.

According to the present invention, there is provided a screw fastening member suited to holding a driving unit that generates vibrations and shocks in an equipment body.

It is still another object of the present invention to provide a molded product which holds a part in equipment that is adversely affected by vibrations, e.g., the above image forming apparatus or information equipment and is manufactured from a resin material that can eliminate the adverse effect of vibrations from a vibration source such as the motor.

It is still another object of the present invention to provide a mount member which holds/fixes parts of the above image forming apparatus, information equipment, or the like and is suited to holding a reception member such as an optical element for receiving an information signal from a vibration source within the housing of an image forming apparatus.

It is still another object of the present invention to provide a molded product which is used to accurately place/fix parts and units at predetermined positions in an arrangement in which information on an original is scanned with a laser beam, and the information is transferred/scanned on an image carrier or the like through an optical lens by rotating/scanning a polygon mirror upon driving a motor, and can eliminate the influence of the vibrations generated by the motor while guaranteeing mechanical rigidity high enough to fix the respective parts and units.

It is still another object of the present invention to provide a mount member molded from a resin material on which a vibration source such as a motor and a reception member for receiving an optical signal from the vibration source are mounted to be flush with each other, and which suppresses the propagation of vibrations from the vibration source to the reception member to accurately execute receiving operation for a necessary optical signal.

It is still another object of the present invention to provide a molded member for the above mount member, which can guarantee a damping effect for vibrations from the vibration source and mechanical rigidity.

Office equipment such as the laser beam printer described above uses a large amount of resin material for components. Recycling of resin materials at the end of the life cycle of the office equipment has currently raised an issue. The present invention has been made to solve this problem.

In order to solve the above problems, the present invention is characterized in that characterized in that a chip- or pellet-like resin material is evacuated and subjected to dehumidifying/drying processing, and replacement processing in an inert gas in a pre-processing unit, the resin material is then held in an inert gas of a predetermined temperature and pressure in an inert gas permeation unit for a predetermined period of time, the temperature and pressure are decreased, the material is fed to a material hopper whose temperature and pressure are controlled, the material is fed to a plasticizing unit to which a gas of a predetermined temperature and pressure is fed, the resin material is melted in the plasticizing unit, the resin material is injected/charged into a mold which is evacuated in advance to a pressure not more than atmospheric pressure, the pressure is restored to atmospheric pressure after the resin material is cooled for a predetermined period of time, and a foamed product is extracted by opening the mold.

According to one aspect of the present invention, there is provided a molding apparatus for a foamed product, characterized by comprising a pre-processing unit which is connected to a material silo and removes moisture and fats adhering to a material, an inert gas permeation unit which is connected to the pre-processing unit and constituted by an inert gas cylinder, a pressure reducing unit, a pressure-relief valve, a gas metering unit, gas flowmeter, a heater, a pressure sensor, a pressure controller, a temperature sensor, a temperature controller, and a pressure vessel, a material feed pump connected to the gas permeation unit, a material hopper connected to the material feed pump, an opening/closing valve controller connected to the inert gas permeation unit and an opening/closing valve of the material hopper, a gas feed controller coupled to a metering portion of a molding unit plasticizing unit through a gas feed pipe, a molding unit, and a mold which is connected to a vacuum pump and has a seal member.

According to another aspect of the present invention, there is provided a foamed product characterized by being molded by the above molding method.

According to still another aspect of the present invention, there is provided a foamed product characterized by being molded by the above molding apparatus.

According to still another aspect of the present invention, there is provided a foam molding method of molding a resin molded member by injecting a resin material into a mold, characterized in that a foaming gas is made to permeate the resin material in the step before the step of plasticizing the resin material.

According to still another aspect of the present invention, there is provided a foam molding method of molding a resin molded member by injecting a resin material into a mold, characterized in that after the step of dehumidifying/drying the resin material, the step of making an inert gas permeate the resin material, and then the resin material is injected into a mold through the plasticizing step.

According to still another aspect of the present invention, there is provided a molding method for a foamed product, characterized in that a chip- or pellet-like resin material is dehumidified and evacuated/dried, an atmosphere is replaced by an inert gas such as nitrogen or carbon dioxide gas, and then the resin material is held for a predetermined period of time at a temperature not more than a thermal deformation temperature of the resin material and a pressure of 0.5 to 0.6 MPa which is not more than a supercritical pressure of the inert gas to make the inert gas permeate the resin material.

According to still another aspect of the present invention, there is provided a resin molded product for audio equipment or video equipment, which is incorporated in a housing of the equipment for outputting an audio signal or video signal and is molded from a resin material for holding a driving member in the equipment, characterized in that vibration damping function objects are contained in the resin molded product in the step of molding the resin molded product.

According to still another aspect of the present invention, there is provided a resin molded product for audio equipment or video equipment, which is formed from a resin material on which a vibration source unit in the audio equipment or video equipment is mounted, characterized in that function objects for preventing a deterioration in function of audio playback operation or video playback operation due to the vibration source unit are contained in the molded product.

According to still another aspect of the present invention, there is provided a housing structure for audio equipment or video equipment, characterized by comprising a structural member of the equipment body, means for generating an audio signal or video signal, and a resin molded product which is located between the signal generating means and the structural member and contains vibration damping function objects for damping vibrations externally transferred through the structural member.

In addition, according to the present invention, there is provided a resin molded product formed by molding a resin material, characterized in that a gas is contained in the resin material to form cells, and external vibrations are damped by making the cells deform upon application of the vibrations.

According to still another aspect of the present invention, in order to solve the above problems, there is provided a structural member formed from a resin material, characterized in that a viscosity property near a surface layer of the structural member is made stronger than that near a central portion, and a spring property near the central portion is made stronger than that near the surface layer.

According to still another aspect of the present invention, in order to solve the above problems, there is provided a manufacturing method for a structural member molded from a resin material, characterized in that a mold member having a cavity corresponding to the structure to be molded, injection means for injecting the molten resin material into the mold member, means for injecting a gas into the molten resin material in the cavity, and means for controlling a surface temperature of the mold member are provided, and the surface temperature of the mold is controlled to a temperature not more than a predetermined temperature with respect to a thermal deformation temperature of the resin material by the control means to make bubbles of the gas near a surface position in a resin molded product become smaller than bubbles of the gas at a central portion of the molded product.

According to still another aspect of the present invention, in order to solve the above problems, there is provided an antivibration member, characterized in that when the antivibration member is molded by using a resin material, a gas is injected into the resin material to form cells, and diameters of the cells in the molded product are set to gradually increase from a surface of the molded product to a central portion.

In addition, in order to solve the above problems, there is provided an antivibration mechanism for holding a driving unit in an equipment body, characterized in that the driving unit is mounted on the equipment body through a resin molded product in which cells are formed by injecting a gas into the resin molded product in the molding step for the molded product and which is mounted on a mount portion of the driving unit.

According to still another aspect of the present invention, there is provided a screw fastening member characterized in that the screw fastening member has a screw hole with which a male thread is threadably engaged, and is molded from a resin material, and cells having diameters on the micron order are formed in the molded product by injecting a gas into the resin material in the step of processing the resin material.

According to still another aspect of the present invention, in order to solve the above problems, there is provided a processing method for an antivibration member, characterized in that a pellet-like resin material fed to a resin material portion is fed to a hopper connected to a plasticizing unit of an injection molding unit, the resin material is fed from the hopper to a plasticizing portion of the plasticizing unit, the resin material is heated and kneaded by rotation of a screw mounted in the plasticizing unit and heat generated by a heater, a gas is fed from a gas feed portion to the plasticizing portion through a feed path, the molten resin material and the gas are mixed and the gas permeates the resin material in the plasticizing portion, a predetermined amount of mixture of the resin material and the gas is charged into a cavity in a mold whose temperature is controlled to a predetermined temperature in advance at a predetermined pressure and speed, and the holding pressure step is performed for a predetermined period of time with a predetermined holding pressure, thereby obtaining a molded product after cooling.

According to still another aspect of the present invention, in order to solve the above problems, there is provided a molded product which is made of a resin material and on which first means including a vibration source object and second means including a reception object for receiving a signal from the vibration source object are mounted, characterized in that damping function objects for damping vibrations generated by the vibration source object are contained in the molded product in the molding step for the molded product.

According to still another aspect of the present invention, in order to solve the above problem, there is provided a molded product made of a resin material which holds a rotating member for receiving information from an information source and transferring the information to an information reception object and the reception object for receiving the information from the rotating member on a mount surface while maintaining an optical positional relationship between the rotating member and the reception object, characterized in that damping function objects for damping vibrations generated by the rotating member are contained in the molded product.

According to still another aspect of the present invention, in order to solve the above problems, there is provided a mount member on which transfer means for transferring a signal from signal generating means for generating image information to an optical element upon rotation, characterized in that the mount member is molded by using a resin material, and a function portion for damping vibrations is molded together in the molding process.

In addition, according to the present invention, there is provided a molded product which is molded from a resin material and incorporated in an image forming apparatus, characterized in that means for transferring an image signal from image creating means and image reception means are mounted on the molded product and cells are formed in the molded product to suppress an influence of vibrations on the image reception means.

According to still another aspect of the present invention, there is provided a manufacturing method for a damping function molded product, characterized in that injection molding is performed by using resin pellets which an inert gas of not more than a supercritical pressure is made to permeate in advance at a temperature not more than a thermal deformation temperature of a resin material, and a mixture of the resin material and the inert gas controls the number, shapes, sizes of cells in the molded product by controlling conditions including a pressure with which the gas is injected into the resin material, an amount of gas injected, an injection pressure of the resin material, an injection speed, an injection amount, a holding pressure, a holding pressure time, a cooling gradient of the mold, and a cooling time.

In addition, according to the present invention, there is provided a molded product wherein a vibration damping factor between a position of the image transfer means and a position of the image reception means is adjusted to not less than 35 dB/sec.

The flexural rigidity of the molded product is preferably set to 4,500 to 9,800 MPa.

If a molded product having a flexural rigidity of 4,500 MPa or less is fixed with screws, the molded product deforms by about 10 μm, resulting in a change (deterioration) in optical function.

In a high-temperature, high-humidity condition of 60° C. and 80% or a low-temperature, low-humidity condition of −10° C. and 0%, the molded product also deforms, resulting in a deterioration in print precision.

With 9,800 MPa or more, no problem arises in association with screw fastening and environmental changes. However, since an excess amount of glass fiber must be added to the material to increase the rigidity, the brittleness strength and shock strength decrease. As a consequence, the product cannot meet specifications associated with a drop test and the like, leading to an increase in material cost and a deterioration in productivity.

The number, shapes, and sizes of cells in the molded product can be controlled by controlling conditions for a mixture of the resin material and the inert gas, e.g., the pressure with which the gas is injected into the resin material, the amount of gas injected, the injection pressure of the resin material, the injection speed, the injection amount, the holding pressure, the holding pressure time, the cooling gradient of the mold, and the cooling time.

More specifically, as the amount of gas injected into the resin material increases, the concentration of the compressed gas increases. Hence, the gas concentration in the resin increases. As a consequence, the number of cells in foaming increases. The same effect as described above can be obtained by increasing the amount of gas injected.

As the injection pressure of a resin material increases, the concentration of a mixture of the resin and gas increases due to compression when it is injected. For this reason, the concentration of the mixture increases when it is charged into the mold, and the foaming magnification decreases. As a result, the diameters of cells decrease.

The concentration of the mixture in the mold can also be increased by increasing the injection amount, raising the holding pressure, and prolonging the holding pressure time. This leads to reductions in foaming magnification and cell diameter.

If the injection speed is increased, the material is charged into the mole at higher speed. This shortens the time required for foaming, and hence reduces the diameters of cells.

The same effect as described above can be obtained by increasing the cooling gradient of the mold and prolonging the cooling time.

The charged resin is cooled from its surface owing to the transfer of heat to the mold and escaping of heat. As the cooling gradient increases, the resin is cooled faster. This shortens the foaming time. As a result, the diameters of cells decrease.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 9 is a view showing a comparison in molding cycle between foam molding according to the prior art and foam molding according to the first embodiment;

FIG. 10 is a view showing the relationship between the filling time, the pressure difference in a filling process, and the cell size;

FIGS. 11A and 11B are views showing processing conditions for processing performed by the apparatus in FIG. 1 and the results;

FIG. 12 is a view showing a comparison in quality between molded products according to the first embodiment and molded products formed by the conventional method;

FIG. 26 is a view showing the types of resin materials used in the second embodiment, the thicknesses of molded products made of the respective resin materials, the vibration damping factors based on cell diameters, and the weight reduction ratios of the resin materials;

FIG. 27 is a view showing the types of resin materials used in the second embodiment, the thicknesses of molded products made of the respective resin materials, the vibration damping factors based on cell diameters, and the weight reduction ratios of the resin materials;

FIG. 33 is a view showing the results obtained by measuring cells in cross-sectional structures of molded products; and FIG. 34 is a view showing the vibration damping factors of molded products.

DETAILED DESCRIPTION OF THE PREFERRED EMBODIMENTS

Figure 1:
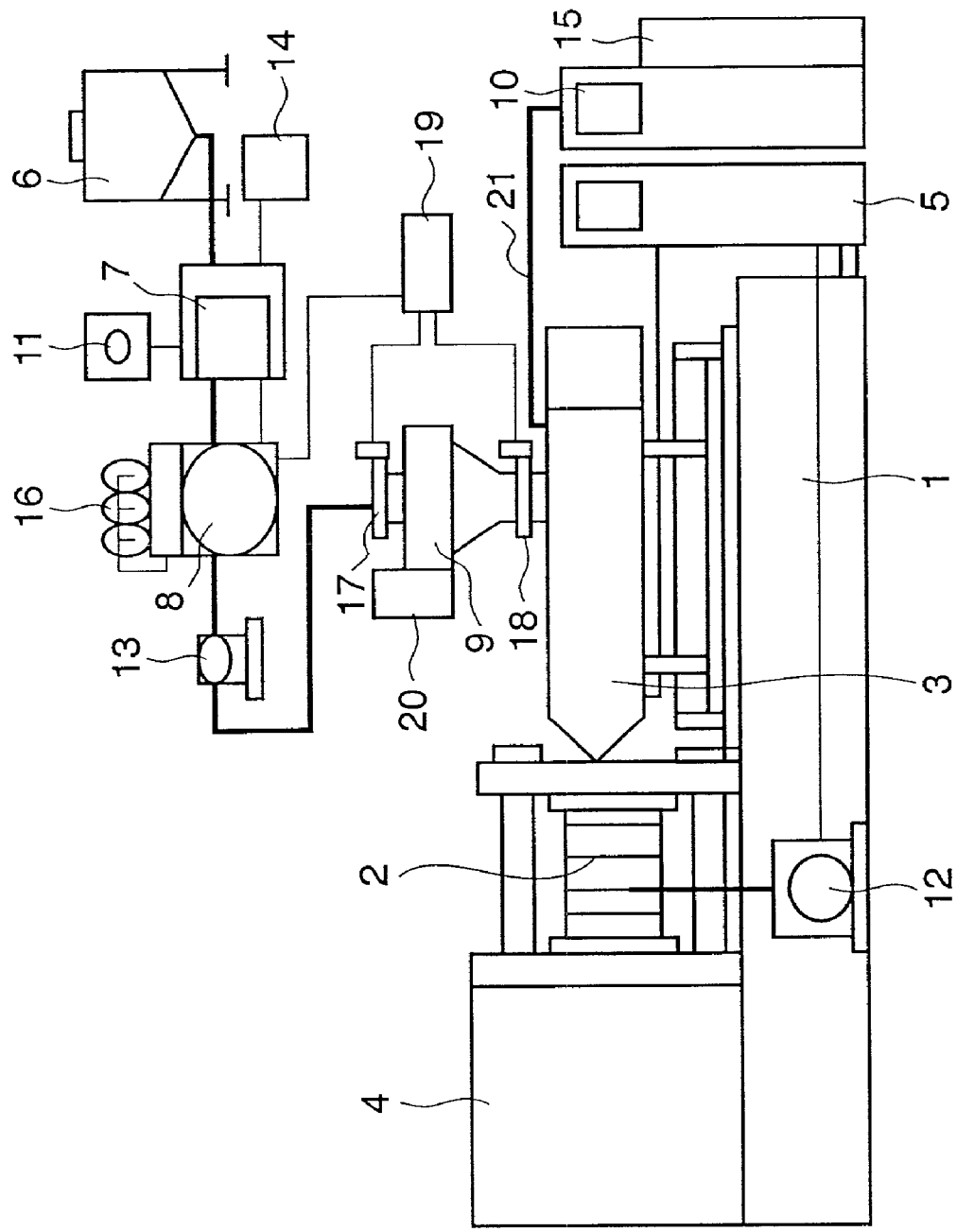
FIG. 1 is a view showing an apparatus according to the first embodiment.

The preferred embodiments of the present invention will be described below.

(First Embodiment)

The first characteristic feature of this embodiment is that resin chips or pellets are processed by a dehumidifier/dryer connected to a vacuum pump and inert gas feeder. In general, it takes as much time as 24 hr or more to let an inert gas permeate in pellets at a temperature equal to or lower than the melting temperature of a resin. Because of poor productivity and difficulty in commercialization, a method of directly blowing a gas into a molten resin in a plasticizing unit and mechanically mixing the resin and gas is used. The present inventor found that the permeating rate of a gas could be greatly increased by making pellets come into contact with a gas after the pellets were evacuated and dehumidified. This leads to the pre-processing step in this embodiment. As in this embodiment, when an inert gas is made to permeate pre-processed chips or pellets at a temperature equal to or lower than the melting temperature of the resin in an inert gas permeation unit, the gas can be made to permeate the material quickly and sufficiently. Since the chips or pellets which the gas has permeated are melted and molded by the plasticizing unit, there is no need to blow a gas into a molten resin in the plasticizing unit as in the prior art. As a consequence, there is no chance that a molten resin portion that comes into contact with the gas is quickly cooled and increases in viscosity, requiring much time to restore a resin temperature and viscosity which are suited to molding. In addition, there is no need to heat the gas to a temperature near the melting temperature of the resin in advance. This makes it possible to eliminate the drawback in the prior art that the foaming magnification after the charge of a gas into a mold is very low due to a low gas pressure in the resin. Furthermore, since there is no need to raise the temperature and pressure of a gas, the amount of gas blown need not be controlled, and there is no chance that a two-isolated-layer structure is formed. This eliminates the necessity to repeat mechanical kneading operation using a static mixer or the like. This prevents the molding apparatus from being complicated and eliminates the drawback that the cycle is prolonged to decrease the productivity.

FIG. 9 shows a comparison between the molding cycle in foam molding in the prior art and that in foam molding in this embodiment.

Referring to FIG. 9, the reason why the injection time in foam molding in the prior art is longer than that in general molding is that a gas charged into a mold in advance in foam molding in the prior art serves as a resistance in injecting/charging a resin. The reason why the injection time in this embodiment is short is that the mold is evacuated in advance. In foam molding, no holding pressure time is required because a gas in a resin serves as a holding pressure. As for a cooling time, since a resin in foam molding is smaller in amount than that in general molding by the volume of gas for foaming, the amount of heat held in the resin is smaller than that in general molding by the weight difference. Since the amount of heat absorbed by the mold is small, the cooling time is short. The reason why the cooling time in this embodiment is slightly shorter than that in the prior art is that the foaming ratio in the embodiment is higher and the amount of resin is smaller. In general, metering of a resin is started at the start of cooling and completed before the completion of cooling. As in conventional foam molding, if it takes time to mix a gas with a molten resin, and the metering time is longer than the cooling time, the process demanding a longer time influences the molding cycle. Referring to FIG. 9, although the cooling time in conventional foam molding is 7 sec which is shorter than that in general molding, since the metering time is as long as 20 sec, the metering time, 20 sec, must be taken into account for the molding cycle. As described above, it is also obvious from FIG. 9 that this embodiment can effectively shorten the molding cycle.

The second characteristic feature of this embodiment is that an opening/closing valve is placed between a metering portion and a material hopper, and a gas whose temperature and pressure are controlled is fed to the metering portion of a plasticizing unit. With this characteristic feature, when chips or pellets which a gas has permeated are plasticized by the plasticizing unit, even if the gas that has permeated the material at the melting temperature tries to vaporize and flow backward to the metering portion of the plasticizing unit, since the gas is pushed by the gas fed from the metering portion or in a pressure equilibrium state, no backflow and discharge of gas occurs.

The third characteristic feature of this embodiment is that when a molten resin in which a gas has dissolved is to be injected/charged into a mold, the cavity in the mold is evacuated to a pressure equal to or lower than atmospheric pressure by a vacuum pump in advance. This makes it possible to charge the resin at high speed because there is no resistance in charging the resin. As a consequence, the time required for foaming while the resin flows in a filling time is short, and there is almost no difference in foaming magnification between a portion near the gate and a portion near the finally filled portion of the flow end. In addition, as compared with the conventional technique of raising the internal pressure of a mold to a pressure equal to or higher than atmospheric pressure by using a gas pressure, the difference between the molten resin pressure and the pressure in the mold is large, the diameter of a cell can be decreased. Hence, the strength of a foam greatly increases.

FIG. 10 shows the relationship between the pressure difference in filling operation and the cell size.

Referring to FIG. 10, if the mold is evacuated in advance as in this embodiment, the injection/filling time can be shortened. Since the filling time in the mold is short, the difference in pressure between a portion near the gate and the finally filled portion is small. If there is no pressure difference, since the same pressure is applied to the resin and cells, the resultant cells have the same size. When the filling time is one sec or less, since the pressure difference is small, the cell size difference is small, and the cell size is small.

The first embodiment will be described in detail below with reference to the accompanying drawings.

FIG. 1 shows the first embodiment of the present invention. Reference numeral 1 denotes an injection molding apparatus; 2, a mold; 3, a plasticizing unit; 4, a locking portion; 5, a controller for the injection molding apparatus; 6, a material silo; 7, a dehumidifier/dryer; 8, an inert gas permeation unit; 9, a material hopper; 10, an inert gas feed controller; 11 and 12, vacuum pumps; 13, a material feed pump; 14, 15, and 16, inert gas cylinders; 17 and 18, opening/closing valves; 19, an opening/closing valve controller; 20, a material hopper controller; and 21, an inert gas feed pipe that couples the inert gas feed controller 10 to the metering side of the plasticizing unit 3.

The operation of the arrangement shown in FIG. 1 will be described next. In general, a resin material is carried by a tank lorry or in a bag containing 25 kg of resin and stored in the material silo 6. The material stored in the material silo 6 is transferred to the dehumidifier/dryer 7 through a material feed pipe. The dehumidifier/dryer 7 is connected to the vacuum pump 11 and inert gas cylinder 14 and incorporates a heater. The resin material transferred to the dehumidifier/dryer 7 is dehumidified at a predetermined degree of vacuum, and then replaced with an inert gas. The material is kept in a predetermined period of time while it is controlled to a predetermined pressure and temperature. Fats adhering to the surface of the resin material in the form of chips or pellets and moisture permeating the resin material are removed, and the replacement gas is adsorbed in the surface and partly permeates the material. Thereafter, the material is supplied to the inert gas permeation unit 8.

The inert gas permeation unit 8 is connected to the inert gas cylinder 16. The inert gas permeation unit 8 incorporates a heater, pressure reducing valve, pressure sensor, temperature sensor, electromagnetic valve, pressure-relief valve, pressure controller, temperature controller, and stirring unit. The material transferred to the inert gas permeation unit 8 is kept and stirred for a predetermined period of time at a predetermined gas pressure and temperature. The predetermined temperature and pressure allow an inert gas to permeate the resin material chips or pellets. Thereafter, the temperature and pressure are decreased, and the permeating inert gas is trapped in the resin material chips or pellets. Thereafter, the resin material is fed to the material hopper 9 by the material feed pump 13. The material hopper 9 has the opening/closing valves 17 and 18 on the inert gas permeation unit 8 side and the plasticizing unit 3 side of the injection molding apparatus, andisconnected to the material hopper controller 20 for controlling temperature and pressure.

When permeation is completed in the inert gas permeation unit 8, the corresponding signal is sent to the material feed pump 13 and opening/closing valve controller 19. As a consequence, the opening/closing valve 17 opens to feed the material to the material hopper 9. After a predetermined amount of resin is fed into the material hopper 9, the opening/closing valve 17 is closed. In addition, the material is supplied to the material hopper while the opening/closing valves 17 and 18 is kept closed. After the opening/closing valve 17 is closed, the opening/closing valve 18 is opened. This prevents the pressure of the metering portion of the plasticizing unit 3 from decreasing while the material is fed. The material hopper 9 is controlled by the material hopper controller 20 to a predetermined temperature and pressure. When an abnormal pressure is applied, the pressure is released by the pressure-relief valve of the material hopper 9.

As molding proceeds, the material in the material hopper 9 is fed to the plasticizing unit 3. The gas feed pipe 21 is coupled to a portion near the coupling portion between the material hopper 9 and the plasticizing unit 3. The inert gas feed controller 10 feeds an inert gas to the metering portion of the plasticizing unit 3 and material hopper 9 at a predetermined pressure and temperature. That is, the material hopper 9 and the metering portion of the plasticizing unit 3 are filled with the inert gas of the predetermined pressure and temperature. The inert gas therefore permeates the material in the inert gas permeation unit 8, the material hopper 9, and the metering portion of the plasticizing unit 3.

The material which the inert gas has permeated is sequentially fed to the nozzle side while being plasticized by the rotation of a screw and back pressure from the injection molding apparatus. The nozzle portion of the plasticizing unit 3 is in tight contact with the mold to prevent a resin from leaking. The resin transferred to a portion near the nozzle distal end is in a molten state, but the inert gas that has permeated the resin is not vaporized or bubble by back pressure from the molding apparatus, gas pressure at the metering portion, and viscosity resistance at the time of melting of the material.

The resin material melted by the plasticizing unit 3 is injected/charged into the cavity in the mold 2 at a predetermined pressure, temperature, and speed. When the material is injected/charged, the cavity in the mold is evacuated by the vacuum pump 12 and set to a pressure equal to or lower than atmospheric pressure. Since the molten resin material rapidly decreases in pressure at the moment of injection, the inert gas in the material starts to bubble. Since the cavity in the mold is near a vacuum state, almost no resistance acts when it is filled with a resin. Therefore, the cavity is filled with the resin in a very short period of time as compared with general molding. Since the filling time is very short, the duration of foaming is also very short. As a consequence, very small cells are formed.

The heat of the charged resin material is then absorbed by the mold, and the material is cooled and solidified. Since the mold temperature is generally equal to or lower than the heat deformation temperature of the resin material, the resin that comes into contact with the mold surface upon charging starts to solidify from its surface. Since the solidification of the resin starts from its surface, the duration of foaming is longer in a central portion than in the surface portion. As a consequence, the diameters of cells in the central portion tend to become larger than those in the surface portion. After the material is cooled in the mold for a predetermined period of time, the mold 2 is opened by the locking portion 4, and the molded product is extracted.

FIG. 11 shows processing conditions for processing in the apparatus in FIG. 1 and results.

Figure 2:
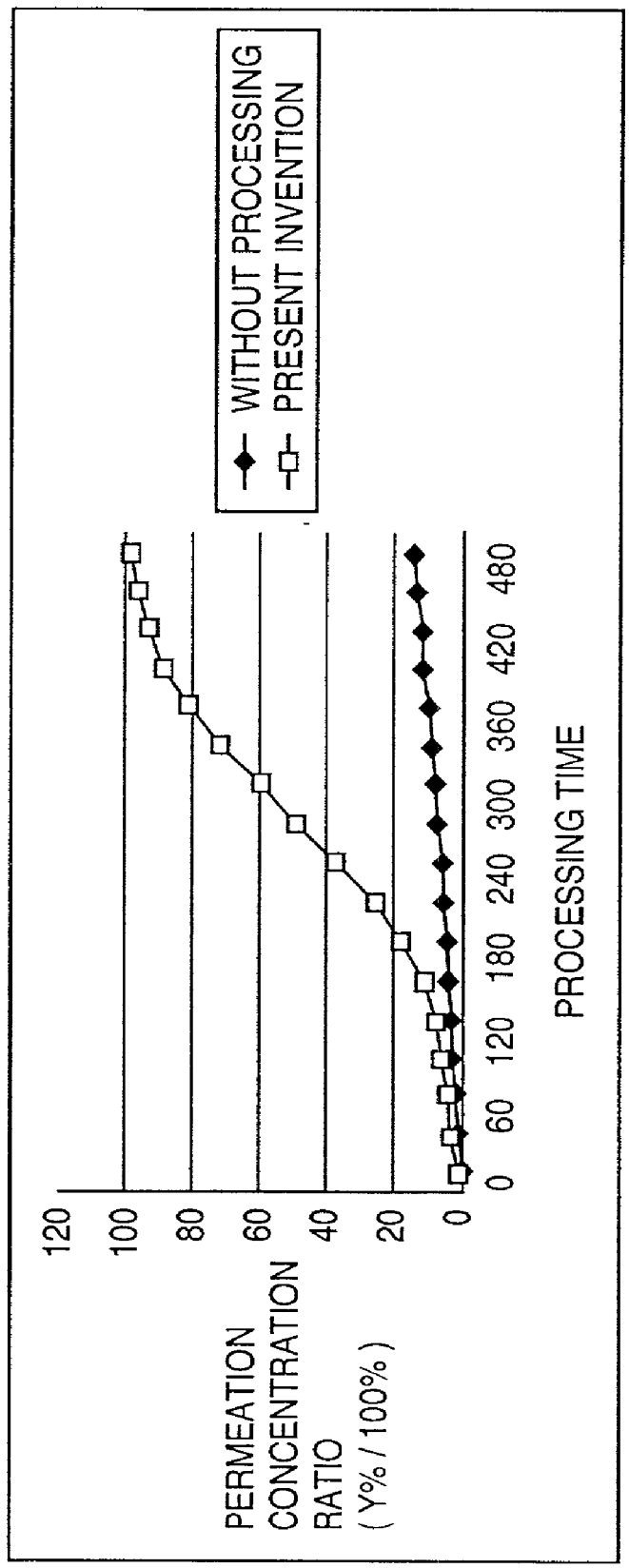
FIG. 2 is a graph showing the gas permeation concentration ratio of a chip- or pellet-like resin material.

FIG. 2 shows the gas permeation concentration ratios with the saturated gas concentration being regarded as 100% when chips or pellets according to this embodiment are no pre-processed and when an inert gas is made to permeate the chips or pellets after they are pre-processed.

As is obvious from FIG. 2, by performing pre-processing according to this embodiment, the gas easily permeates the chips or pellets.

Figure 3:
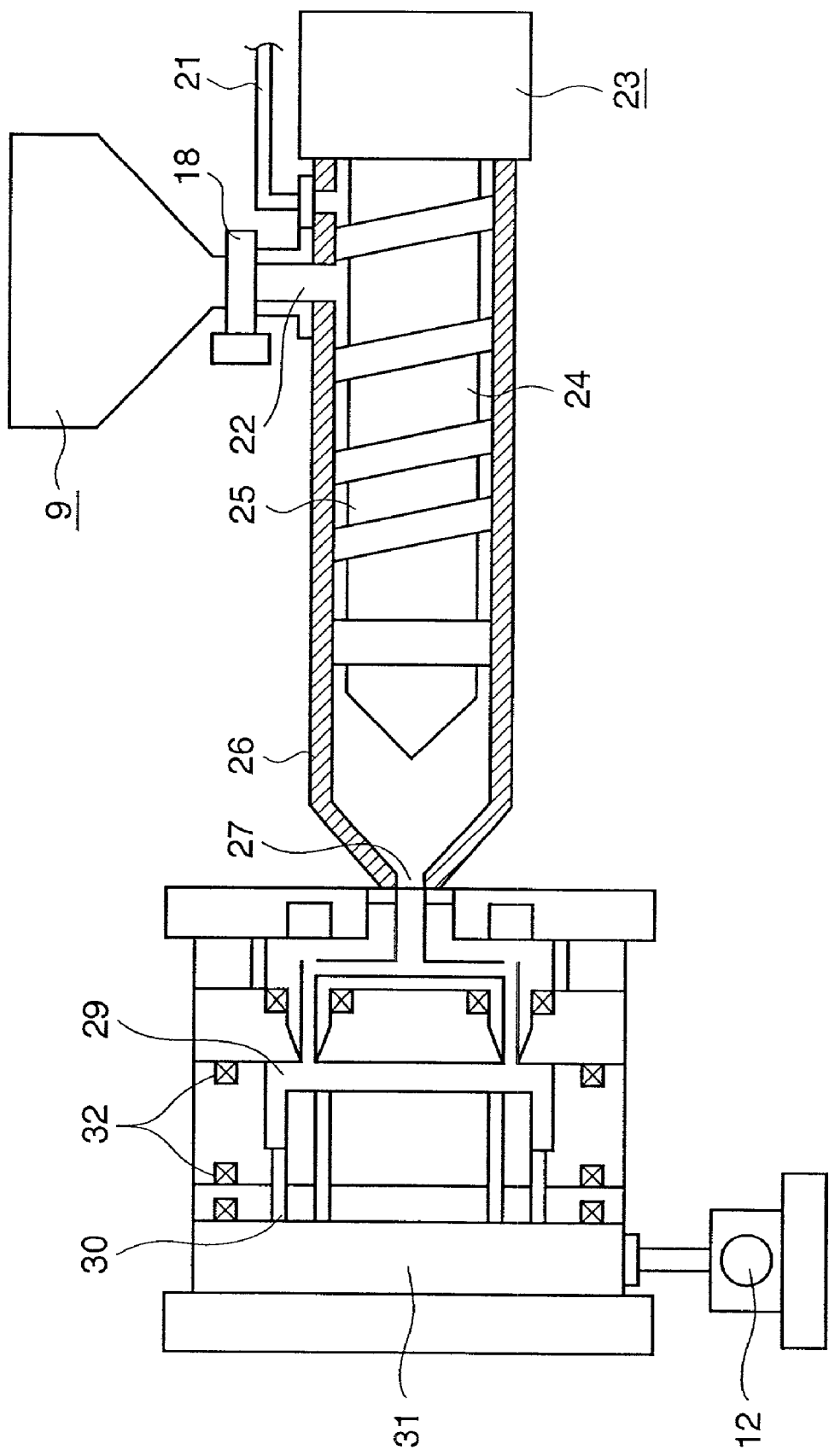
FIG. 3 is a view showing a plasticizing unit and mold portion (needle pin type) according to the first embodiment.

FIG. 3 is a perspective sectional view showing the plasticizing unit 3 and mold 2 of the apparatus shown in FIG. 1. A resin material is transferred from the material hopper 9 to a metering portion 22 through the opening/closing valve 18. Since the temperature of the metering portion 22 is controlled to a temperature equal to or lower than the glass transition temperature of the resin material, the resin material maintains its chip- or pellet-like shape.

An inert gas whose pressure and temperature are controlled is fed to the metering portion 22 through the inert gas feed pipe 21. The inert gas fed through the inert gas feed pipe 21 does not leak to the screw controller side in the presence of a seal member. As the screw rotates, the resin material is sequentially transferred to the nozzle side. The plasticizing unit 3 has a heater mounted on its circumferential portion, andiscontrolled such that the temperature rises toward the nozzle side. Therefore, the resin material starts melting in a plasticizing portion 24 and is completely melted when it passes through a check valve 25. As a consequence, a predetermined amount of resin material is metered in the nozzle portion. Since an opening/closing needle 27 of the nozzle portion is kept closed, the molten/metered resin material does not leak from the nozzle distal end to the mold side. In addition, the inert gas has permeated the resin material chips or pellets. In general, therefore, when the resin starts melting in the plasticizing portion 24, the inert gas that has permeated the resin evaporates as the resin melts and may flow backward to the metering portion 22 side. In this embodiment, however, since the inert gas is fed to the metering portion 22 through the gas feed pipe, and the opening/closing valve 18 is placed at the boundary between the material hopper 9 and the metering portion 22, there is no escape route for the inert gas. Hence, the gas does not flow backward.

When the resin material is completely melted and metered on the nozzle side, since a back pressure is applied to the screw in the plasticizing unit 3 as written in the molding conditions in FIG. 9, a pressure is exerted on the molten material due to the back pressure. This prevents the inert gas in the molten resin from gasifying and expanding. The molten resin material is then injected/charged into a cavity 29 which is set under a pressure equal to or lower than atmospheric pressure by the vacuum pump 12 at the instant when an opening/closing needle 27 opens. The molten resin does not foam in the nozzle because of a high pressure. When, however, the opening/closing needle 27 opens, since the pressure applied to the resin instantly becomes equal to or lower than atmospheric pressure, the resin quickly starts foaming.

To set the cell diameter of a molded product to 20 μm or less, the injection/charging time is preferably set to one sec or less or the filling speed is set to 2 m/sec or higher as in the embodiment shown in FIG. 9. In this case, the contact surface of each template of the mold is sealed with a seal member such as a rubber ring. In addition, the suction port of the vacuum pump is coupled to an ejection unit 31 of the mold. The ejection unit 31 is completely covered with a seal member and metal plate to prevent leakage of a gas. An ejector 30 used to perform ejecting operation in extracting a molded product is also sealed with a seal member.

Figure 4:
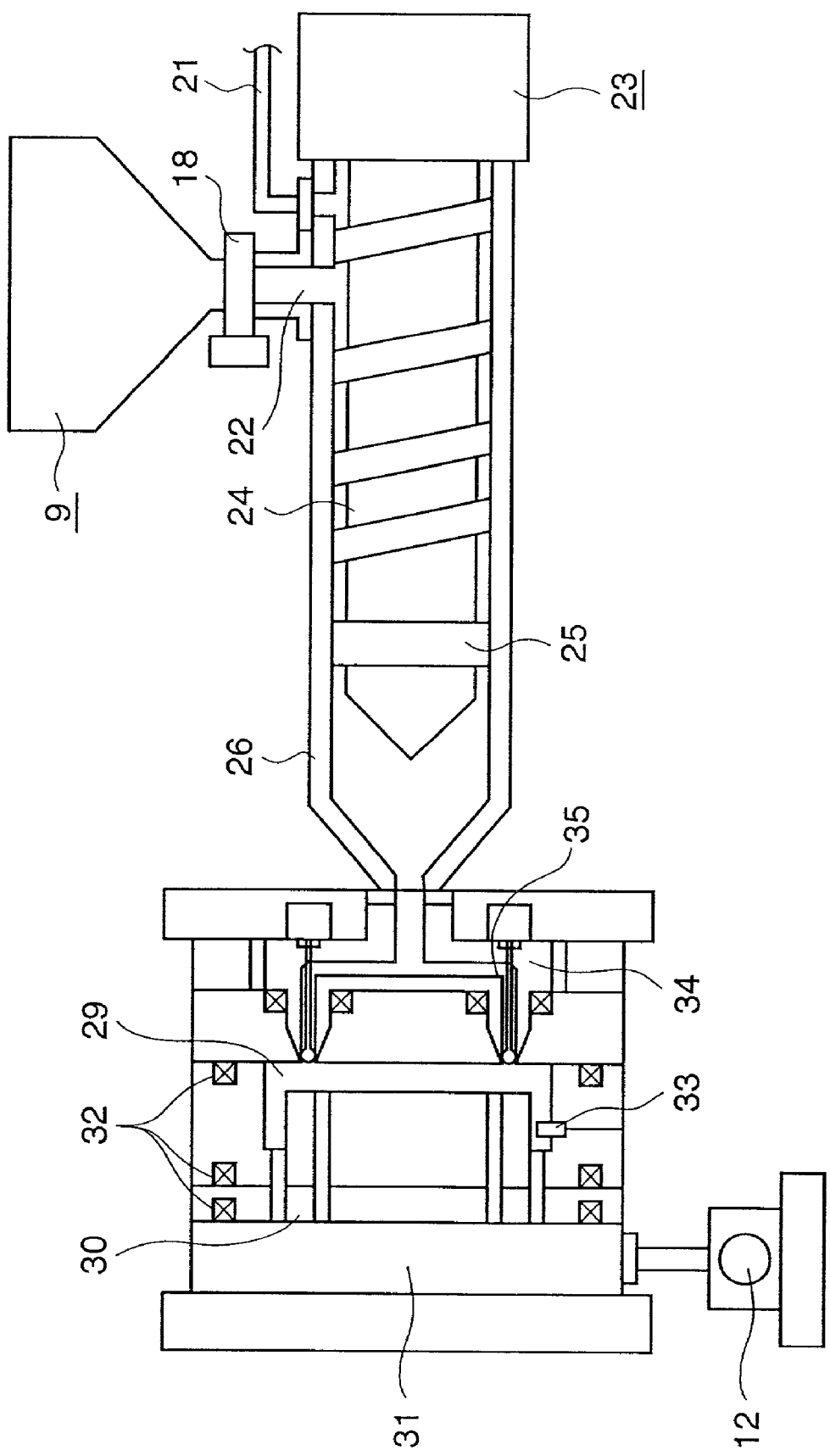
FIG. 4 is a view showing a plasticizing unit and mold portion (hot runner type) according to the first embodiment.

FIG. 4 is a perspective sectional view showing a plasticizing unit without any opening/closing needle and a mold formed by a hot runner 34. A resin material is transferred from the material hopper 9 to the metering portion 22 through the opening/closing valve 18. Since the temperature of the metering portion 22 is controlled to a temperature equal to or lower than the glass transition temperature of the resin material, the resin material maintains its chip- or pellet-like shape. An inert gas whose pressure and temperature are controlled is fed to the metering portion 22 through the inert gas feed pipe 21. The seal member prevents the inert gas fed through the gas feed pipe 21 from leaking to the screw controller side.

As the screw rotates, the resin material is sequentially transferred to the nozzle side. The plasticizing unit 3 has the heater mounted on its circumferential portion, andiscontrolled such that the temperature rises toward the nozzle side. Therefore, the resin material starts melting in the plasticizing portion 24 andiscompletely melted when it passes through the check valve 25. As a consequence, a predetermined amount of resin material is metered in the nozzle portion. An inert gas has permeated the resin material chips or pellets. In general, therefore, when the resin starts melting in the plasticizing portion 24, the inert gas that has permeated the resin evaporates as the resin melts and may flow backward to the metering portion 22 side. In this embodiment, however, since the inert gas is fed to the metering portion 22 through the gas feed pipe, and the opening/closing valve 18 is placed at the boundary between the material hopper 9 and the metering portion 22, there is no escape route for the inert gas. Hence, the gas does not flow backward.

When the resin material is completely melted and metered on the nozzle side to fill the hot runner 34, since a back pressure is exerted on the screw in the plasticizing unit 3 as written in the molding conditions in FIG. 9, a pressure is exerted on the molten material due to the back pressure. This prevents the inert gas in the molten resin from gasifying and expanding. In addition, since a valve pin 35 for opening/closing operation is kept closed, the material does not leak from the hot runner 34 to the cavity 29 side.

The molten resin material is then injected/charged into the cavity 29 which is set under a pressure equal to or lower than atmospheric pressure by the vacuum pump 12 at the instant when the valve pin 35 opens. The molten resin does not foam in the nozzle because of a high pressure. When, however, the valve pin 35 opens, since the pressure applied to the resin instantly becomes equal to or lower than atmospheric pressure, the resin quickly starts foaming. To set the cell diameter of a molded product to 20 μm or less, the injection/charging time is preferably set to one sec or less or the filling speed is set to 2 m/sec or higher as in the embodiment shown in FIG. 9.

In this case, the contact surface of each template of the mold is sealed with a seal member such as a rubber ring. In addition, the suction port of the vacuum pump is coupled to the ejection unit 31 of the mold. The ejection unit 31 is completely covered with a seal member and metal plate to prevent leakage of a gas. The ejector 30 used to perform ejecting operation in extracting a molded product is also sealed with a seal member.

Figure 5:
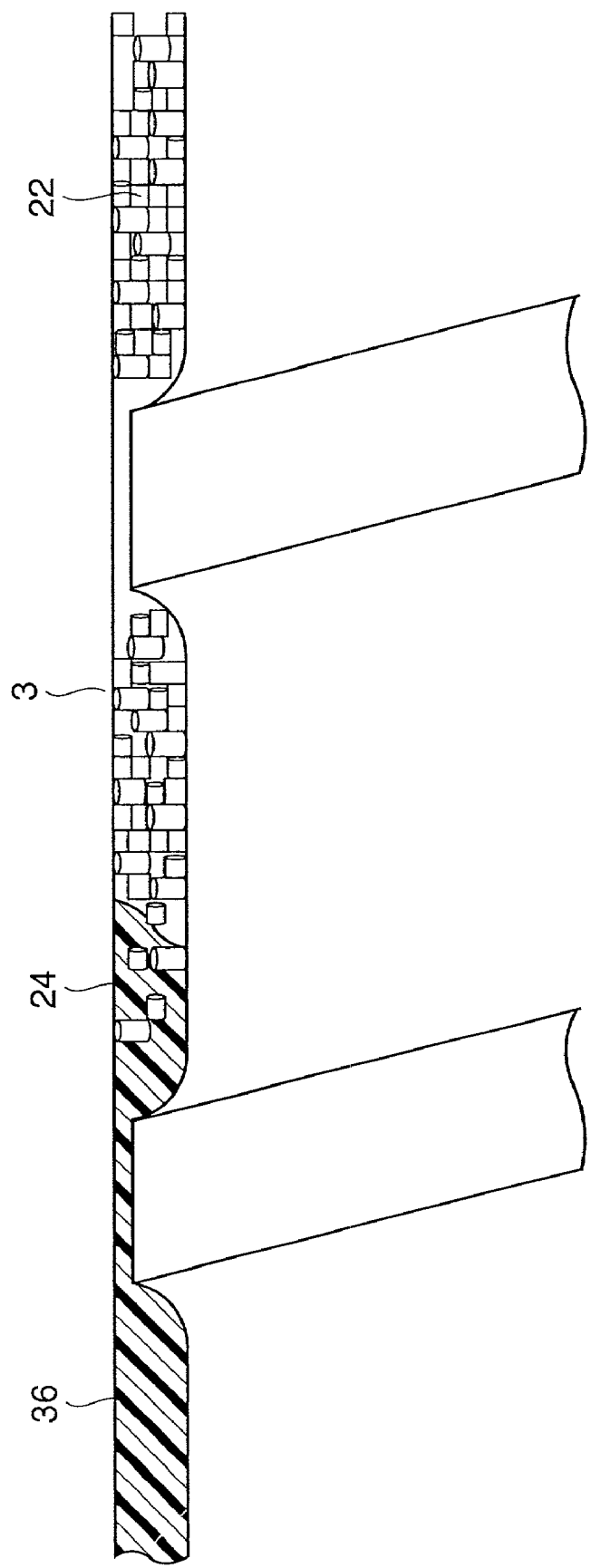
FIG. 5 is a view showing the plasticizing unit.

FIG. 5 is a view showing the state of a resin in the plasticizing unit 3. In the metering portion 22, the resin material maintains its chip- or pellet-like shape. In the plasticizing portion 24, the chip- or pellet-like shape gradually deforms and is partly melted. At this time, in general, the inert gas in the resin evaporates, as described above. In this embodiment, however, the gas does not evaporate owing the arrangement described above. The molten resin material is fed to a nozzle side 36.

Figure 6:
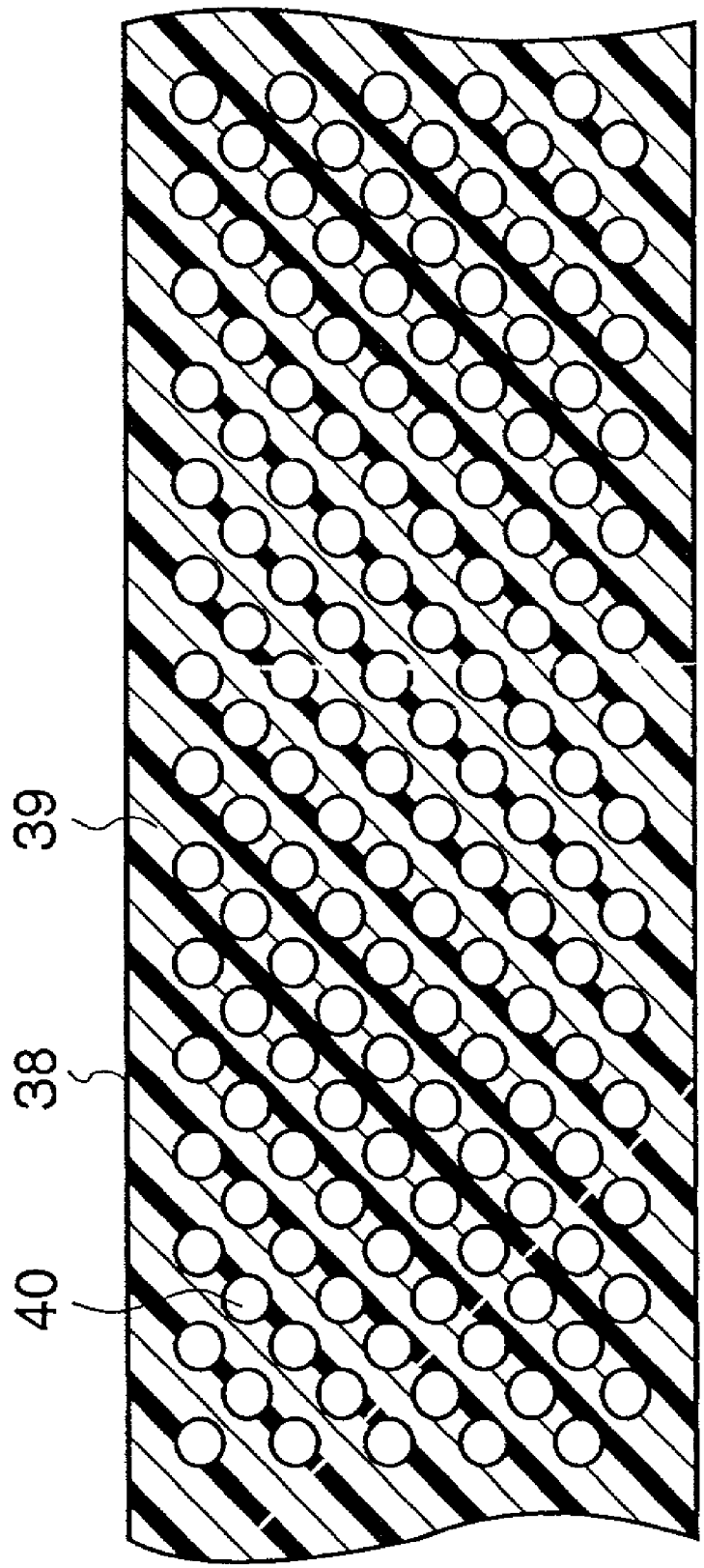
FIG. 6 is a sectional view of a molded product according to the first embodiment.

If a resin material which a gas has permeated before the plasticizing step is used as in this embodiment, since the gas has uniformly permeated each resin material pellet, the resin plasticized/melted in the plasticizing step is in a state where the gas is uniformly dispersed. For this reason, the foamed gas is uniformly dispersed in the molded product produced by filling the mold with the resin material, as shown in FIG. 6. Since the foamed gas is uniformly dispersed, each portion of the molded product exhibits uniform mechanical characteristics, electrical characteristics, thermal characteristics, vibration characteristics, and the like. For this reason, the quality and characteristics of the molded product can be guaranteed and ensured.

Figure 7:
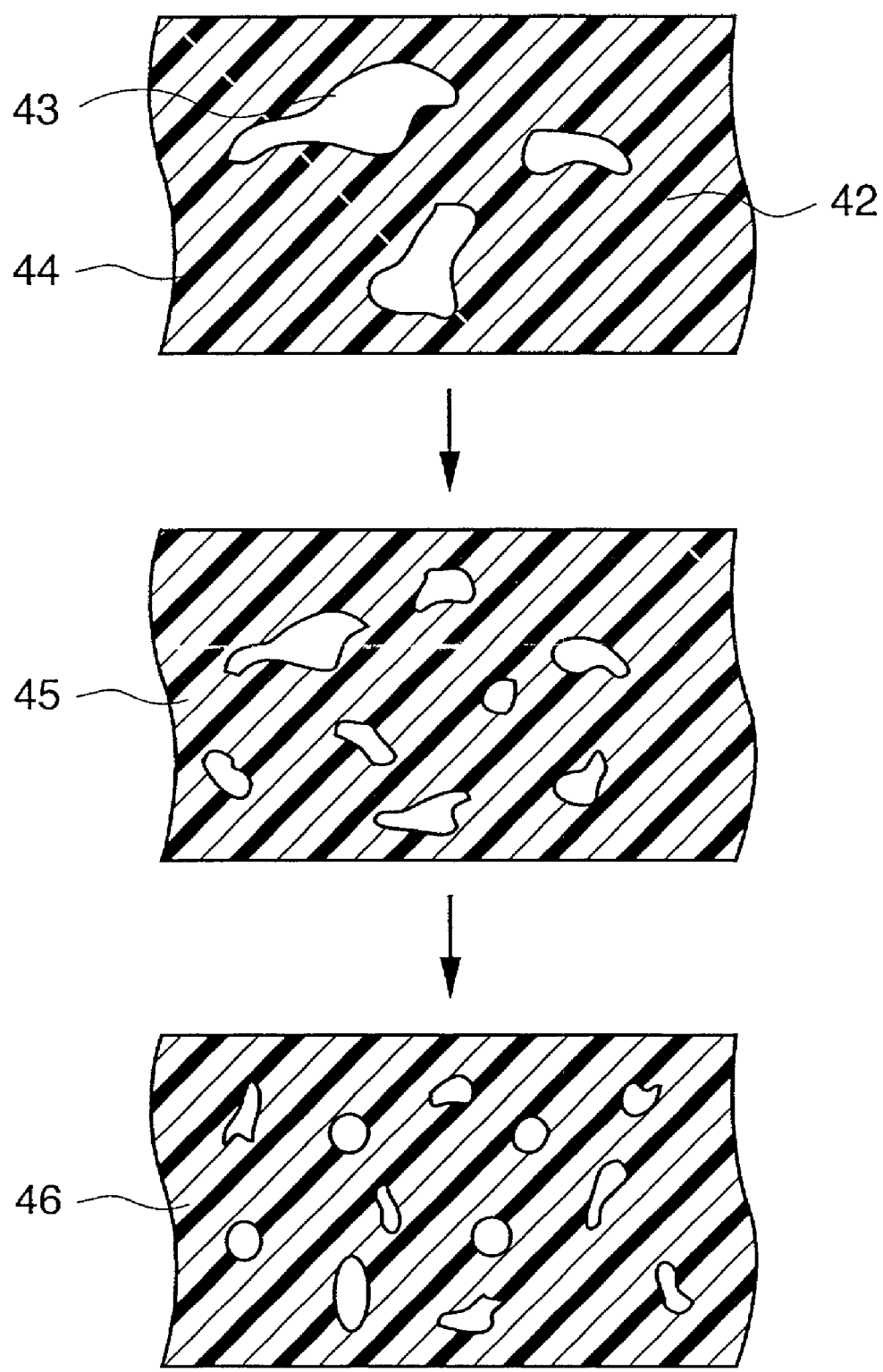
FIG. 7 is a view showing how a resin and gas are mixed in the prior art.
Figure 8:
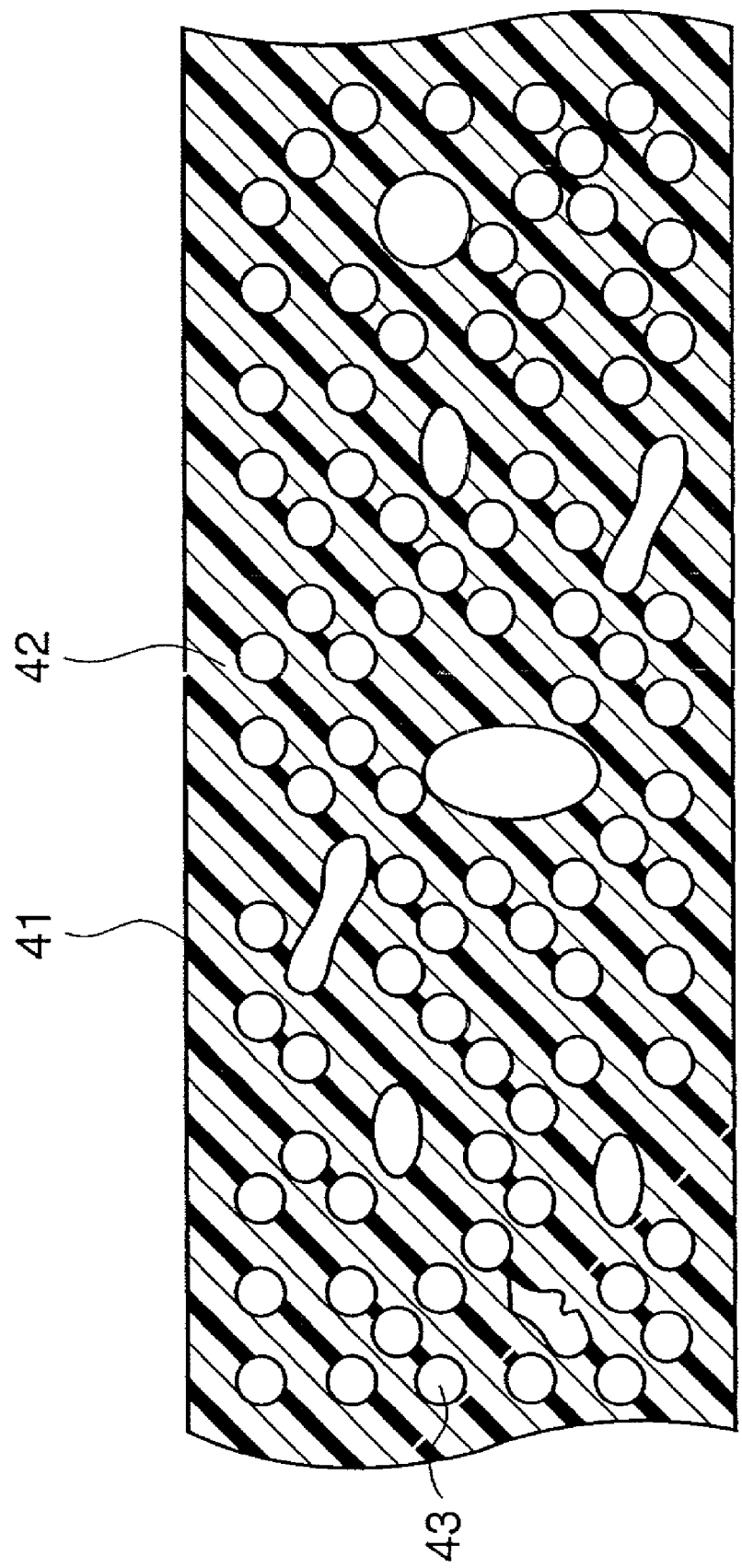
FIG. 8 is a sectional view of a molded product according to the prior art.

In contrast to this, according to the conventional method of blowing a gas into a molten resin and stirring using a mixer or the like, the molten resin and gas are nonuniformly mixed, as shown in FIG. 7. As a consequence, a cross-section of a molded product formed by filling the mold with the resin material exhibits a dispersed state of bubbled gas, like that shown in FIG. 8. For this reason, the molded product exhibits nonuniform mechanical, electrical, thermal, and vibration characteristics and the like. This makes it difficult to guarantee and ensure the quality and characteristics of the molded product. FIG. 12 shows a comparison in quality between the molded product according to this embodiment and the molded product according to the conventional method.

As described above, according to this embodiment, the removal of fats and moisture from the resin surface and its internal portion by dehumidification and drying facilitates adsorption and permeation of an inert gas into a resin material. This eliminates the necessity to heat the resin to a high temperature, e.g., the melting temperature, in the inert gas permeation unit in the next step. In addition, there is no need to set a high pressure of 12 MPa or higher. This makes it possible to let the inert gas satisfactory permeate the resin material without changing its chip- or pellet-like shape.

In addition, there is no need to feed an inert gas with a temperature equal to or lower than the resin temperature into the plasticizing portion of the plasticizing unit and to use a static mixer for mixing the resin and inert gas unlike the prior art. In this embodiment, an inert gas is fed to the metering portion of the plasticizing unit, and the opening/closing valve is placed between the hopper and the plasticizing unit. This can prevent the inert gas from flowing backward from the molten resin to the metering portion and hopper. When the resin is to be charged into the mold, since the internal pressure of the cavity is equal to or lower than atmospheric pressure in this embodiment, the filling speed can be greatly increased. This makes it possible to reduce the cell size.

In addition, there is no need to hold the cavity portion in the mold at atmospheric pressure or higher with a gas as in the prior art. This makes it possible to shorten the molding cycle and improve the productivity. Furthermore, according to the present invention, since it is only required to form an inert gas feed port near the metering portion of a commercially available injection molding apparatus and seal a screw controller, the apparatus can be easily modified.

(Second Embodiment)

The second embodiment of the present invention will be described below with reference to FIGS. 13 to 17.

Figure 13:
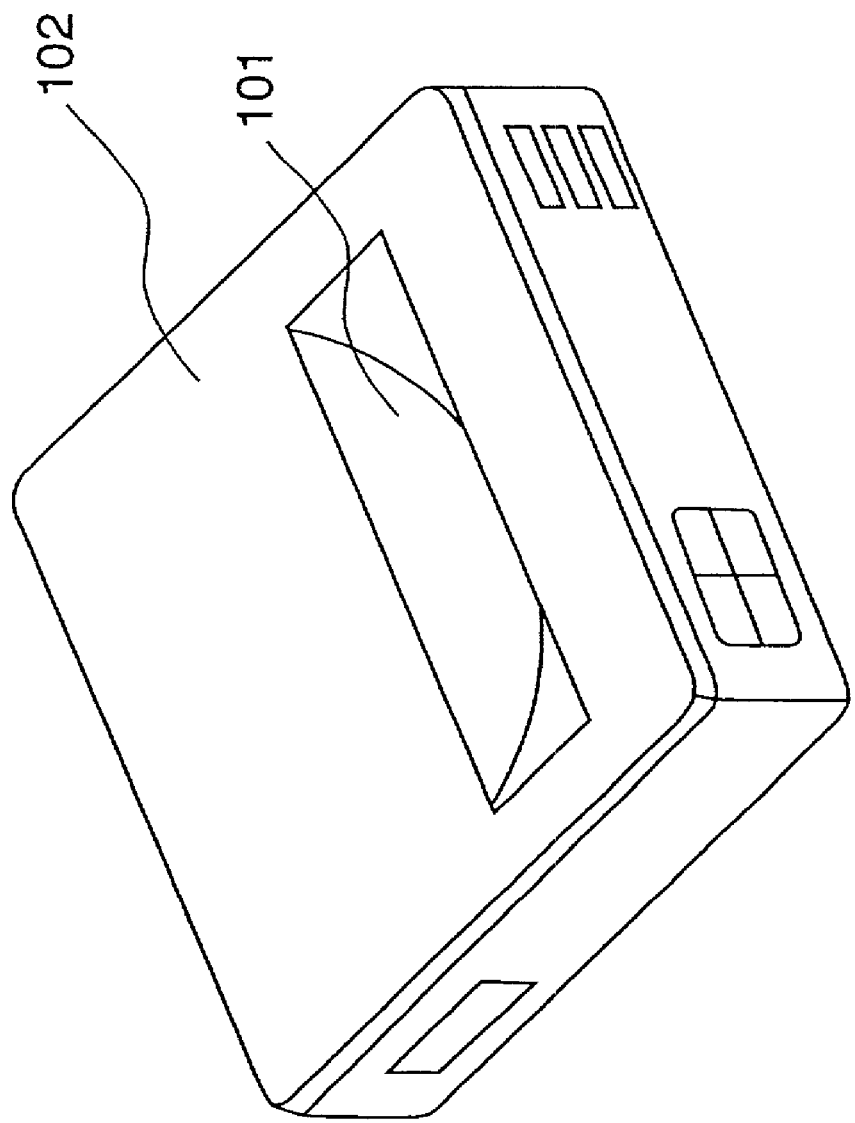
FIG. 13 is a perspective view showing the outer appearance of audio equipment or video equipment to which a resin molded product according to the second embodiment is applied.

FIG. 13 shows the outer appearance of audio or video equipment 102 for playing back musical information or video information recorded on a disk 101.

Figure 14:
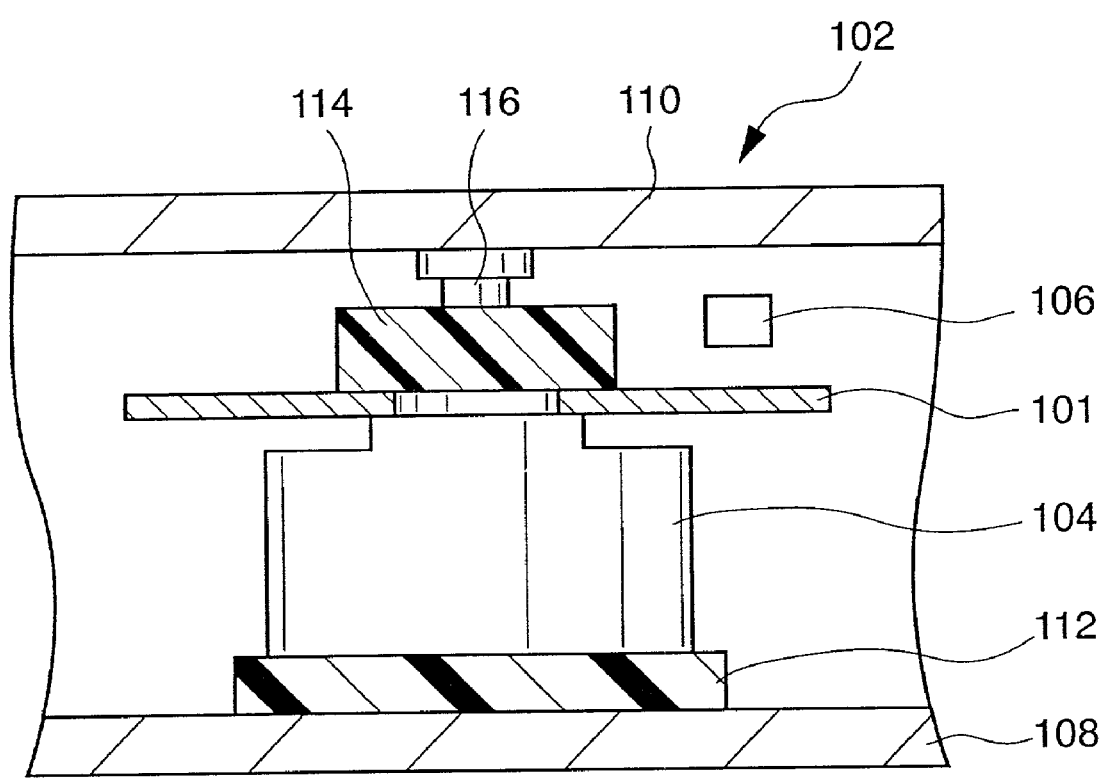
FIG. 14 is a sectional view for explaining the arrangement of the main part of the equipment in FIG. 14.

FIG. 14 is a view for explaining the main part of the internal structure of the video equipment 102. The above compact disk 101 is rotated at a high speed by a rotating/driving means 104, and the information recorded on the surface of the disk 101 is read by a pickup means 106 and subjected to playback processing. The user can listen to the resultant music output from an information output portion through earphones or the like.

The driving means 104 includes a rotating/driving means such as a motor and rotates the disk 101 at a high speed through a bearing portion.

Reference numeral 108 denotes a housing case for the equipment; and 110, an upper cover member.

Reference numerals 112 and 114 denote resin molded products molded from a resin material according to this embodiment. The molded product 112 has a flat-plate shape, which is mounted on the housing case 108. The driving means 104 is placed on the flat surface of the molded product 112.

The molded product 114 has a rectangular parallelepiped shape, which is mounted on the upper cover member through a support member 116. When the upper cover member is closed, the molded product 114 serves to hold the bearing portion.

Figure 15:
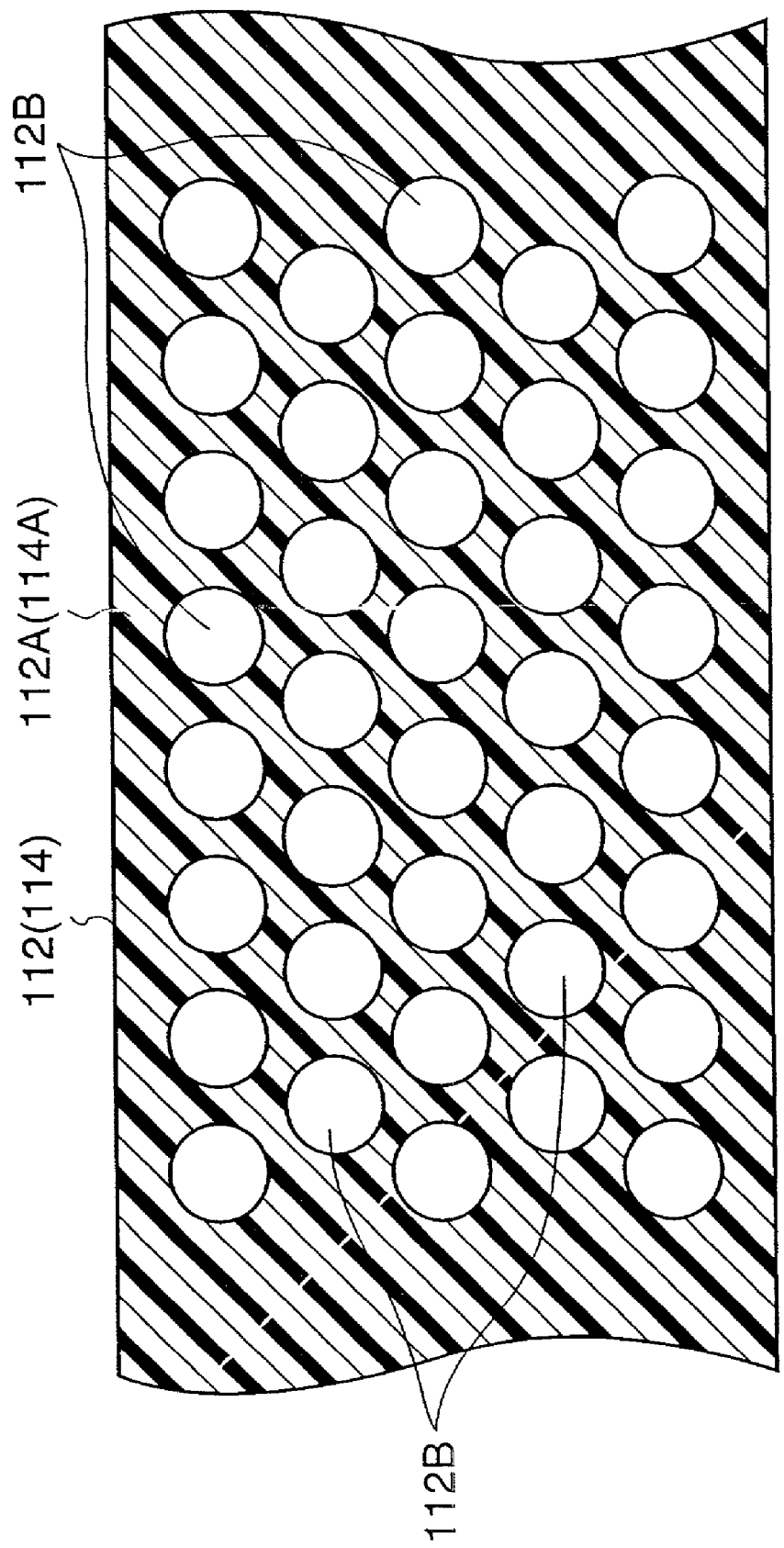
FIG. 15 is a schematic view for explaining a resin molded product according to the second embodiment.

The resin molded products 112 and 114 are made to internally have cells on the micron order by injecting a gas into the molded products in the molding step using a resin material. FIG. 15 is a schematic view showing the sectional structure of each molded product.

Referring to FIG. 15, many cells 112B internally exist in a resin material portion 112A of the molded product 112 (114).

The resin molded products, each having the structure shown in FIG. 15, are placed at positions where they support the bottom portion of the driving means 104 for rotating/driving operation and the upper surface of the member 101 to be rotated/driven as shown in FIG. 14.

With this structure, vibrations from the driving means 104 are absorbed by the molded products 112 and 114. This makes it possible to prevent dropouts of musical information and disturbance of video information.

Figure 16:
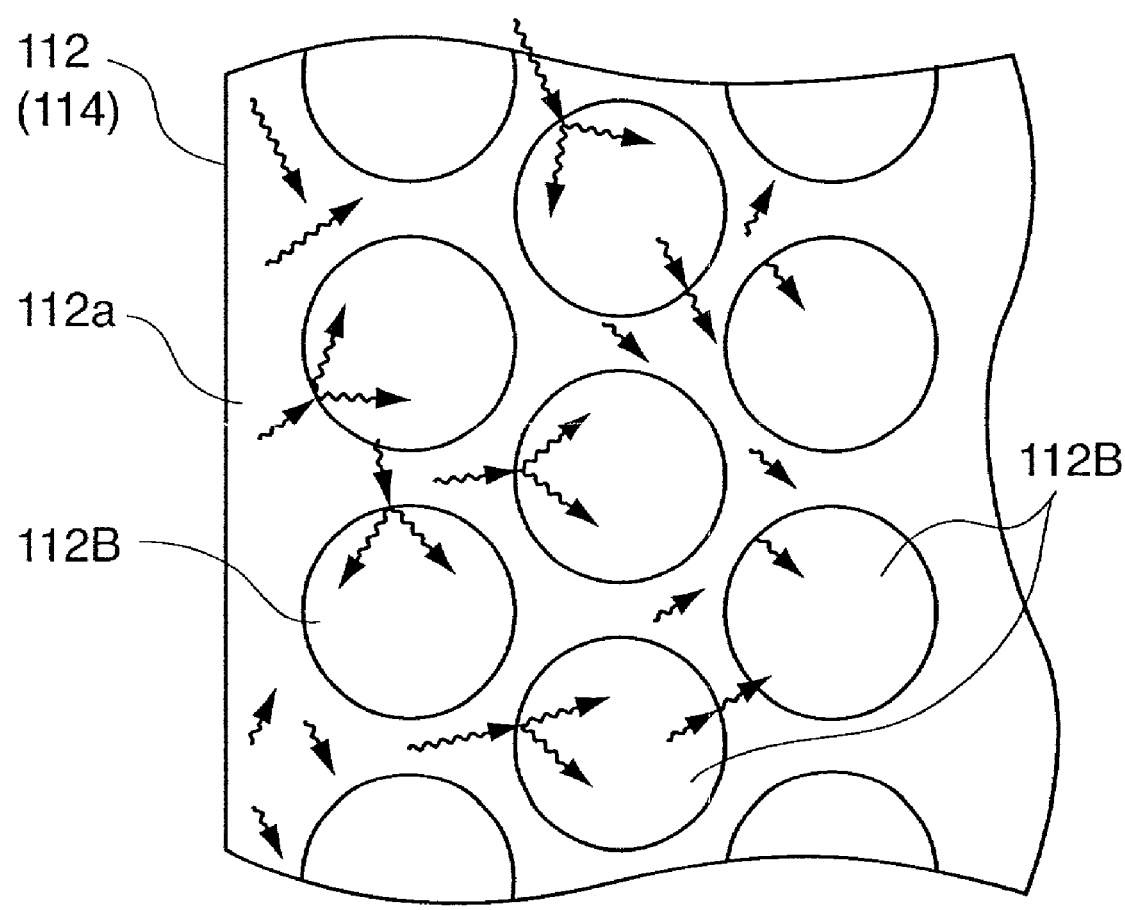
FIG. 16 is a view for explaining the vibration/shock absorbing effect obtained by the resin molded product according to the second embodiment.

The resin molded products according to this embodiment will be further described with reference to FIG. 16. Vibrations from the outside of the equipment and vibrations from the driving means are transferred to the surfaces of the molded products 112 and 114 through neighboring members. The vibrations transferred to a resin molded product surface 112a are transferred from the surface into the resin. However, in the process of causing the vibrations to reach the cells 112B existing in the resin molded product and diffuse into the gas in the cells, the vibrations are weakened. As the vibrations travel through the resin molded product, the vibrations are gradually weakened by cells in the resin.

Although vibrations from the outside of the equipment 102 are transferred from the case 108 to the molded product 112, since the strength and amplitude of vibrations are gradually reduced as described above, the influence of vibrations on the rotating member 101 can be greatly reduced.

Figure 17:
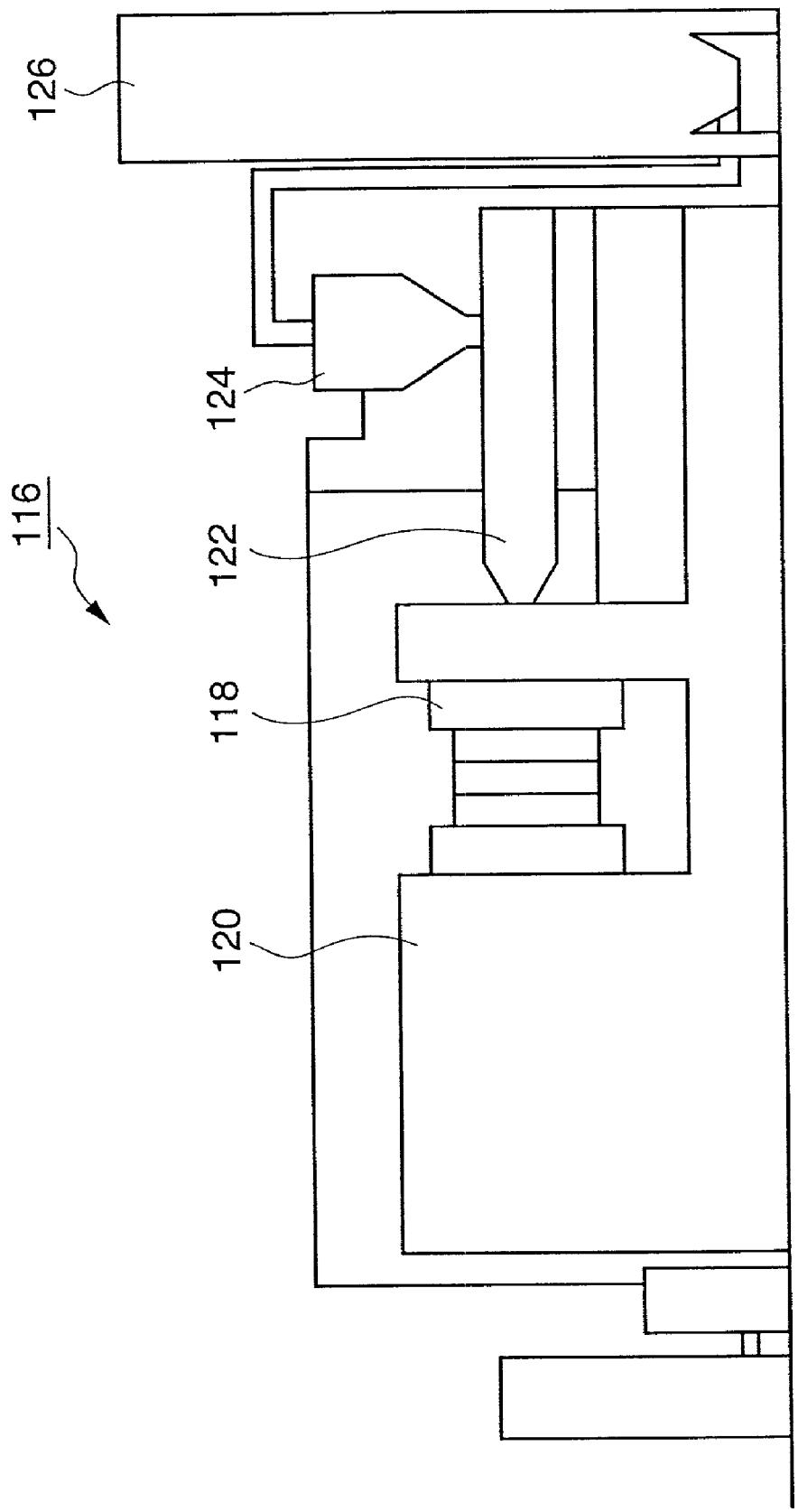
FIG. 17 is a view for explaining a method and apparatus for manufacturing a resin molded product according to the second embodiment.

FIG. 17 is a view for explaining a manufacturing method and apparatus for the molded products 112 and 114 according to this embodiment.

Referring to FIG. 17, reference numeral 116 denotes a molding apparatus body; 118, a mold portion; 120, a locking portion; 122, a plasticizing portion; 124, a hopper; and 126, a resin material feeding portion.

The mold portion 118 has a cavity portion having a mold structure for molding the product 112 or 114.

In this embodiment, carbon dioxide gas ($CO_2$) was used.

Resin pellets which an inert gas of a supercritical pressure has permeated at a temperature equal to or lower than the thermal deformation temperature of the resin material are supplied to the resin material feeding portion 126. The resin material pellets are then fed to the hopper 124 connected to the plasticizing portion 122 of the injection molding apparatus. The material is fed from the hopper 124 to the plasticizing portion 122 to be heated/kneaded and plasticized by rotation of a screw mounted in the plasticizing portion 122 and heat generated by a heater. A mixture of the molten resin material and gas is injected into the cavity in the mold portion 118 by a predetermined amount. After the injection, the holding pressure step and cooling step are sequentially performed.

In the cooling step, the resin material contracts as it is cooled. The gas compensates for contraction for expansion, foaming, and formation of cells.

The sizes of cells formed from the gas vary depending on conditions such as the pressure with which the gas is injected into the resin material, the amount of gas injected, the injection pressure of the resin material, the amount of material injected, the cooling gradient of the mold, and the cooling time.

FIGS. 26 and 27 show the types of resin materials used in this embodiment, the thicknesses of molded products using the respective resin materials, and the damping factors of vibrations and the reduction ratios of the weights of resin materials in association with cell diameters.

(Third Embodiment)

Figure 18:
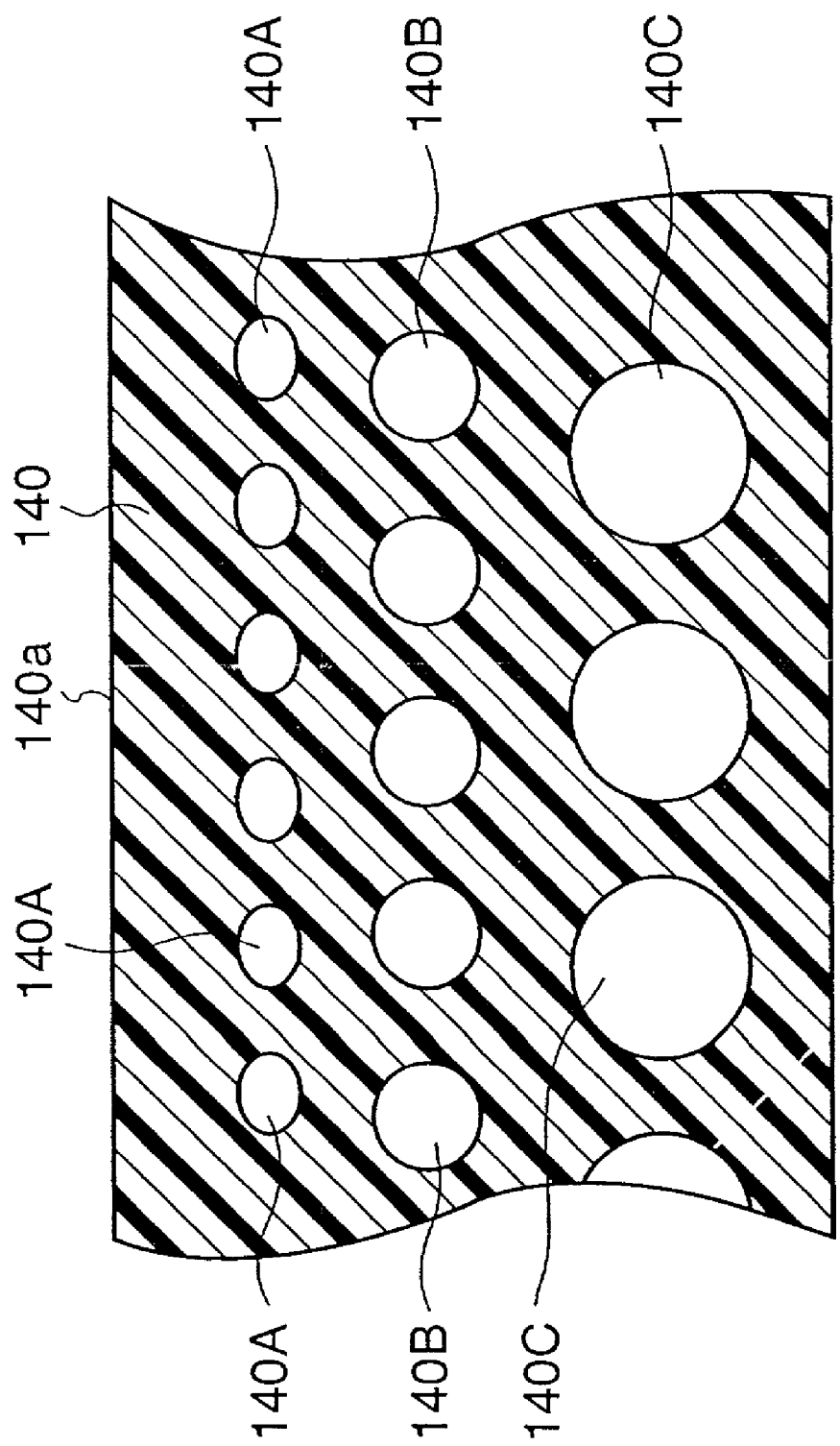
FIG. 18 is a view for explaining a cross-sectional structure of a resin molded product according to the third embodiment.
Figure 19:
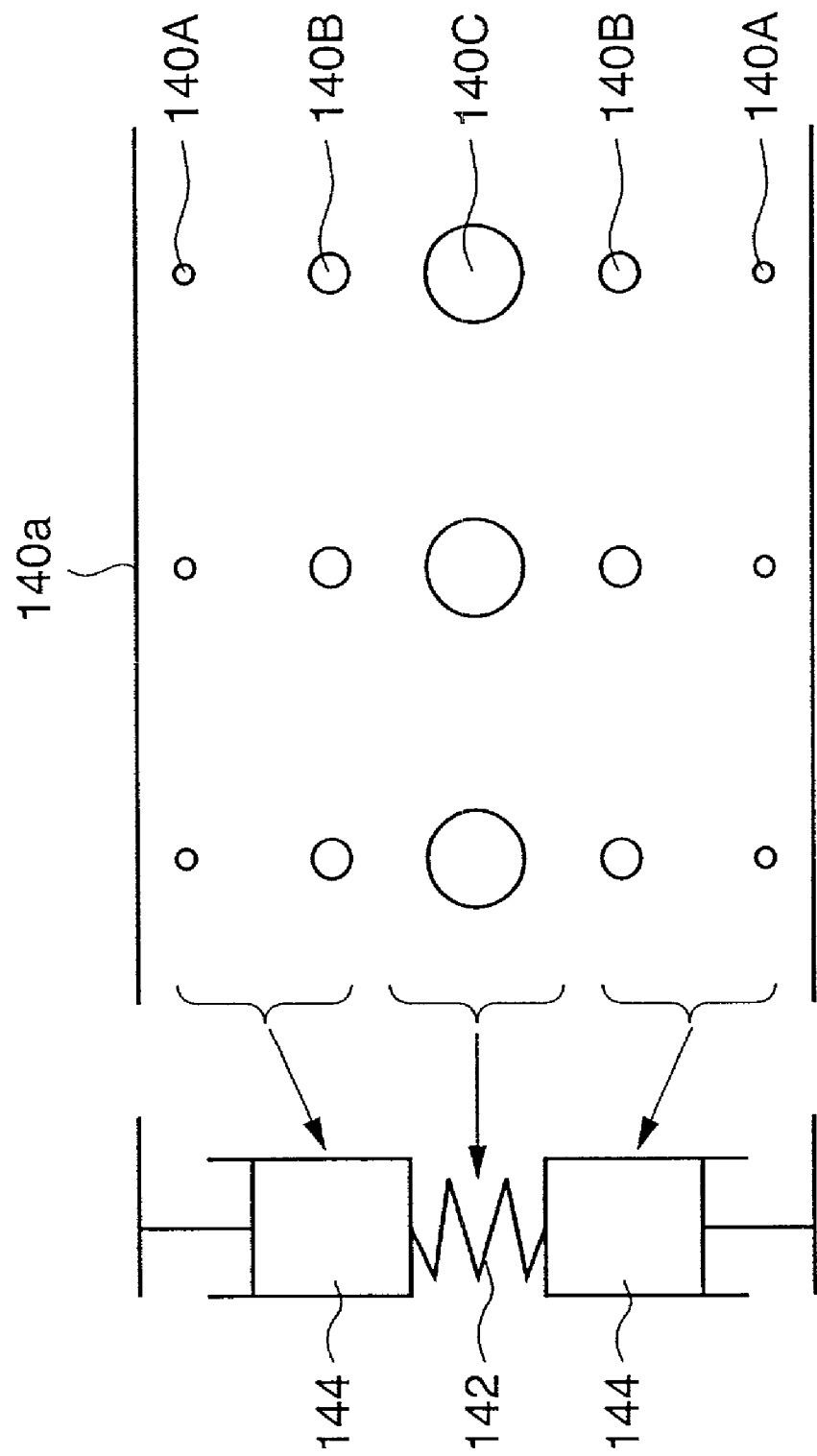
FIG. 19 is a view for explaining the vibration/shock absorbing effect obtained by a resin molded product according to the third embodiment.
Figure 20:
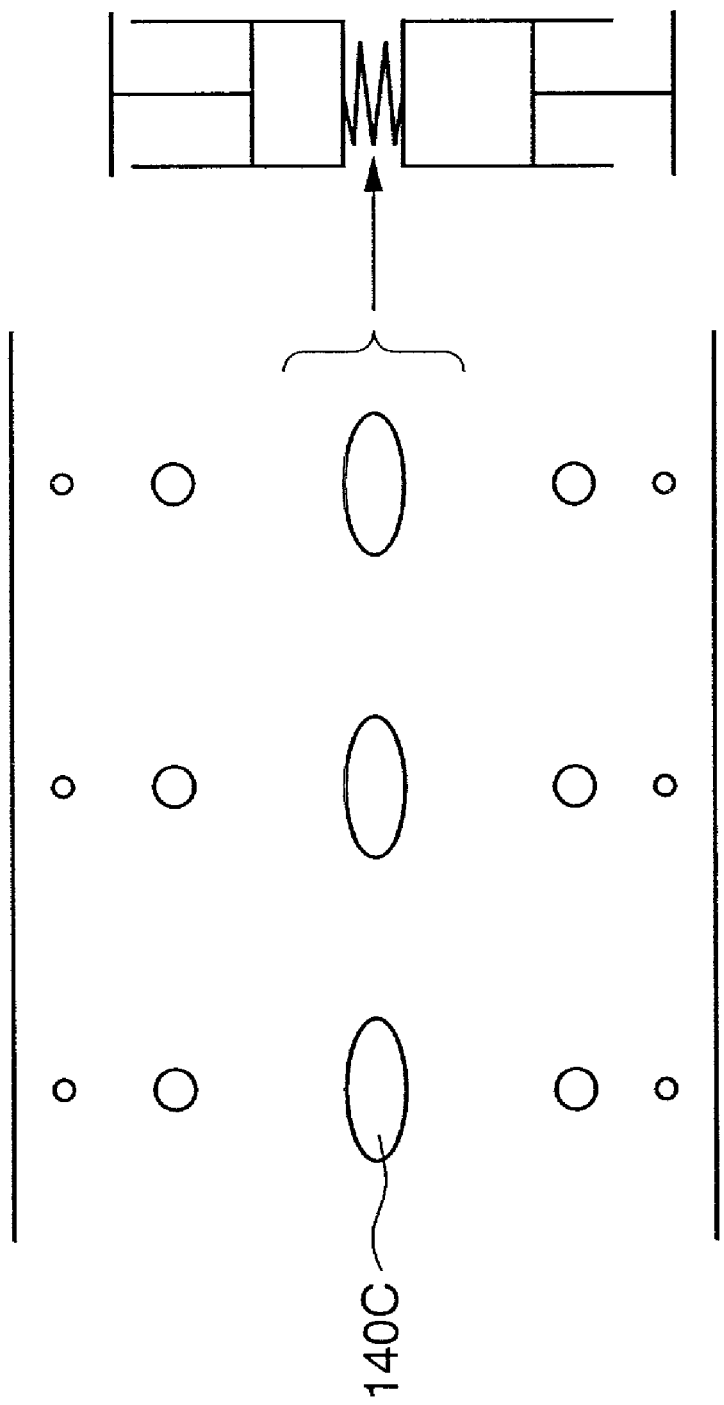
FIG. 20 is a view for explaining the vibration/shock absorbing effect obtained by the resin molded product according to the third embodiment.

FIGS. 18, 19, and 20 are views for explaining the third embodiment of the present invention.

FIG. 18 is a schematic sectional view of a resin molded product according to this embodiment.

Cells 140A, 140B, and 140C existing in a resin molded product 140 of this embodiment vary in diameter depending on their positions in the resin molded product from its surface.

As shown in FIG. 18, each cell 140A located near a surface 140a of the molded product 140 has the smaller diameter than cells in other places, and each cell 140C at the central position in the molded product has the larger diameter than cells in other places. Each cell 140B located between the surface and the central portion has an intermediate diameter.

That is, the cells existing in the resin molded product 140 of this embodiment gradually decrease in diameter from the central portion in the direction of thickness to the surface portion of the molded product.

Shocks and vibrations from the surface of the molded product are diffused and dispersed in the surface and interior of each cell to be damped.

In a portion near the surface, in particular, vibrations with relatively high frequencies which propagate along the surface are absorbed by the many small cells 140A, whereas vibrations and shocks with large amplitudes and accelerations such as waves and swinging are absorbed by the cells 140C located near the central portion in the direction of thickness upon deformation of the cells like balloons.

The diameters of cells can be changed from the central portion to the surface portion as shown in FIG. 18 by setting the temperature of the mold portion to a temperature lower than the thermal deformation temperature of a resin material, filling the mold cavity with the injected resin material, and then quickening cooling/solidification of the surface of the resin material which comes into contact with the mold portion.

If larger cell diameter differences are required, the locking force of the mold is reduced or the mold is opened to a predetermined position to increase the sizes of cells in the central portion of a resin after the mold is filled with the resin and cooling operation proceeds for a predetermined period of time.

FIG. 19 is a view for explaining the effect of absorbing shocks and vibrations in the molded product in FIG. 18. The right side of FIG. 19 is a schematic sectional view of the resin molded product; and the left side, a view showing an arrangement for absorbing shocks.

The surface side of the molded product 140 exhibits strong viscosity properties (dash-pot/damper effect 144), whereas a portion near the central portion in the direction of thickness exhibits strong spring properties 142.

FIG. 20 is a schematic view showing a state in which shocks/vibrations act on the resin molded product 140, and more specifically, how the cells 140C near the central portion in the direction of thickness are flattened by externally applied vibrations with accelerations and relatively large amplitudes to absorb them.

Molding Conditions diameters of cells in molded product according to embodiment:
    cell diameter at surface position 140A: 10 μm
    cell diameter at intermediate position 140B: 25 μm
    cell diameter at central position: 50 μm resin materials used:
    acrylonitrile-butadiene-styrene copolymer (ABS resin)

Dimensions of molded product:
    length: 10 mm, width: 8 mm, and thickness: 4 mm
type of gas: carbon dioxide gas
gas injection pressure: 5 MPa
molding resin temperature: 200° C.
injection pressure: 120 MPa
injection speed: 4 m/sec
injection time: 0.5 sec
cooling time: 8 sec
mold cooling condition: water cooling (water temperature: 20° C.; flow rate: 8 L/min)

(Fourth Embodiment)

Figure 21:
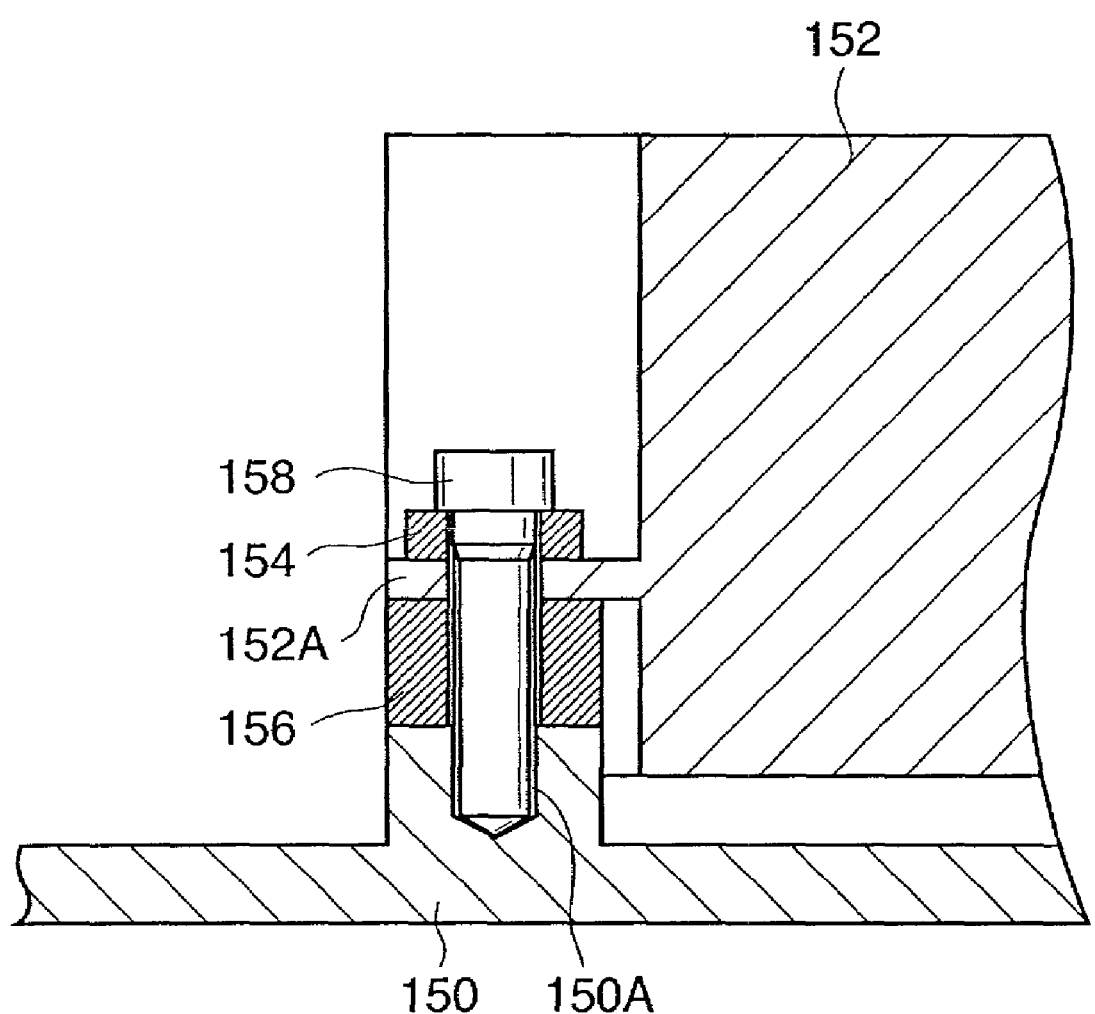
FIG. 21 is a view for explaining an antivibration mechanism according to the fourth embodiment.

FIG. 21 is a view for explaining the fourth embodiment to which the present invention is applied.

Referring to FIG. 21, reference numeral 150 denotes a case member for audio equipment or video equipment; 152, a means for driving a recording medium (not shown), which becomes a source for generating vibrations due to rotational motion and the like; and 154 and 156, antivibration members to which the present invention is applied.

The driving means 152 includes a driving mechanism such as a motor and a flange portion 152A serving as a holding member. This flange portion 152A is fixed to the case member 150 with a screw member 158.

The antivibration members 154 and 156 are threadably engaged with a screw hole 150A formed in the case member 150 with the screw member 158 while clamping the flange portion 152A. The antivibration members 154 and 156 have washer-like shapes having holes through which the screw shaft portion of the screw member 158 extends.

The antivibration members 154 and 156 are molded/processed by the mold portion of the molding apparatus shown in FIG. 17. Cells are formed in these members by using carbon dioxide gas.

Urethane elastomer was used as a resin material.

The antivibration member 154 has a circular shape with an outer diameter of 8 mm, a thickness of 3 mm, and screw hole diameter 3.5 mm.

The antivibration member 156 has a substantially cylindrical shape with an outer diameter of 10 mm, a thickness of 8 mm, and a screw hole diameter of 3.5 mm.

The sizes of cells in the antivibration members 154 and 156 in this embodiment fell in the range of 10 to 25 μm.

As shown in FIG. 21, when the antivibration members 154 and 156 are placed to vertically clamp the flange portion 152A and are fixed with the screw member 158, vibrations generated by the driving means 152 are transferred from the flange portion 152A to the antivibration members 154 and 156. However, vibrations from the surfaces of the antivibration members 154 and 156 which are in contact with the flange portion propagate in the antivibration members and are damped in the antivibration members 154 and 156. As a consequence, the transmissibility of vibrations to the screw member 158 is greatly reduced, and the transmissibility of vibrations from the screw member 158 to the case member 150 is greatly reduced.

As described above, according to this embodiment, an antivibration mechanism which has a high antivibration effect and is used to hold a driving unit in an equipment body while maintaining an antivibration function, which is realized by mounting the driving unit in the equipment body through resin molded products, attached to the mount portion of the driving unit, in which cells are formed by injecting a gas into the molded product in the molding process.

(Fifth Embodiment)

Figure 22:
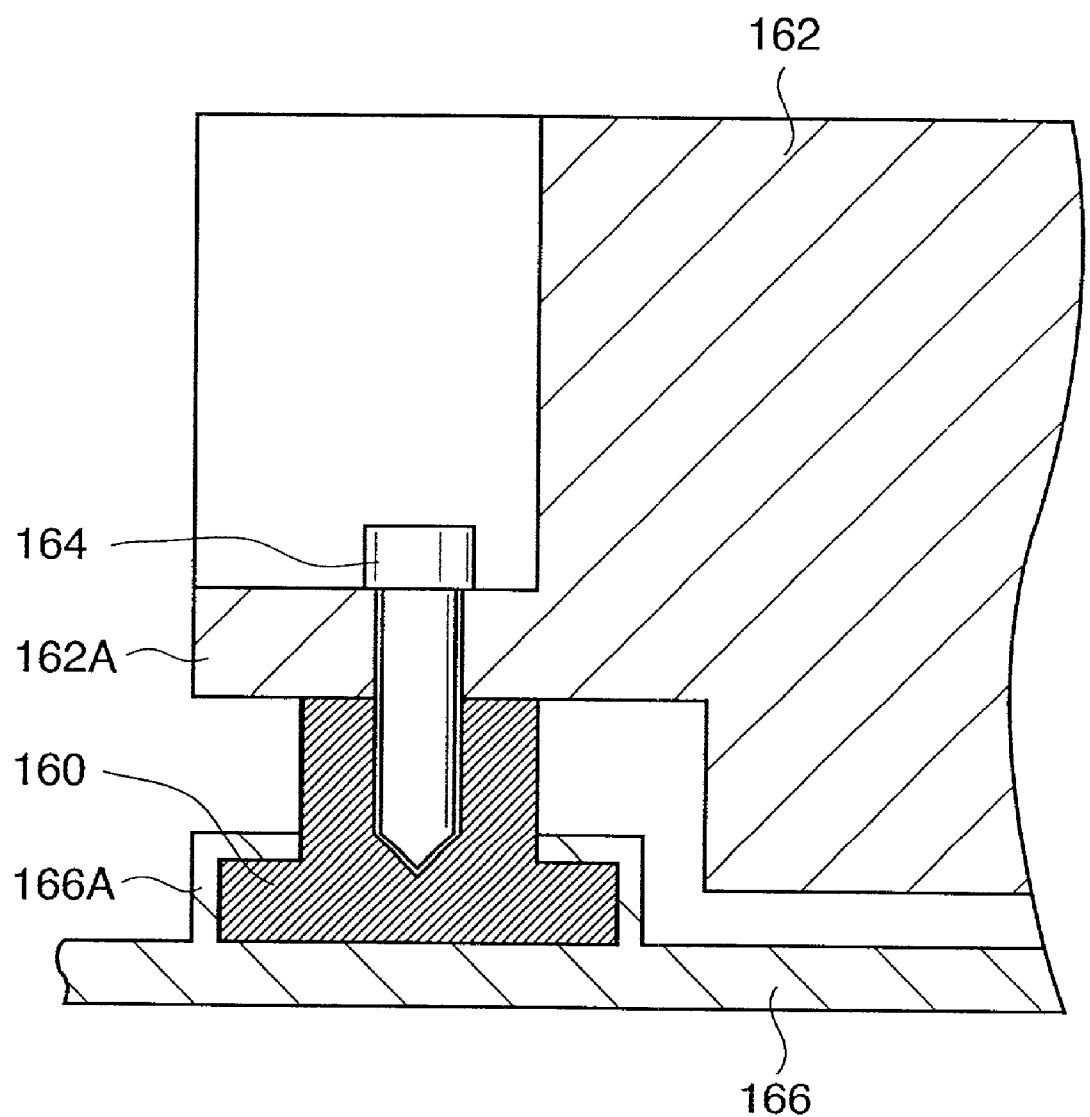
FIG. 22 is a view for explaining an antivibration mechanism according to the fifth embodiment.
Figure 23:
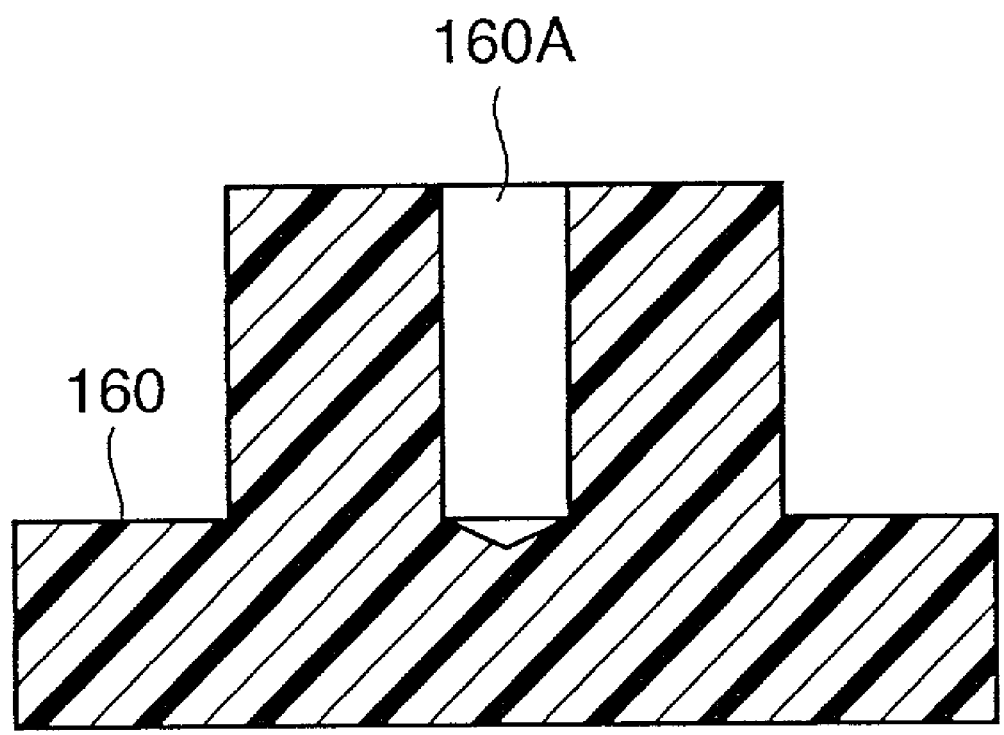
FIG. 23 is a view for explaining an antivibration member according to the fifth embodiment.

FIGS. 22 and 23 show the fifth embodiment of the present invention.

This embodiment proposes an antivibration member having a high antivibration effect. Referring to FIGS. 22 and 23, reference numeral 160 denotes a cellular resin molded product according to the second embodiment described above, which has a screw hole 160A serving as a female thread for threadable engagement.

Reference numeral 162 denotes a driving means serving as a vibration source similar to those described in the above embodiments. This driving means has a flange portion 162A for mounting.

Reference numeral 164 denotes a screw member; and 166, a case member of equipment.

The antivibration member 160 is placed in an antivibration member mounting recess portion 166A formed on the lower surface side of the case member 166. The flange portion 162A is fixed/held on the case member 166 through the antivibration member 160 with the screw member 164.

The antivibration member 160 having the arrangement shown in FIGS. 22 and 23 is made of a resin material having cells inside. With this structure, as described above, vibrations from the driving means are damped by a vibration absorbing effect in the process of propagating from the surface of the antivibration member 160 into its interior. As a consequence, the vibrations from the driving means which propagate to the case member are reduced. This makes it possible to greatly reduce the chance that the vibrations from the driving means may propagate to other parts and units in the equipment through the case member to cause a problem.

Figure 24:
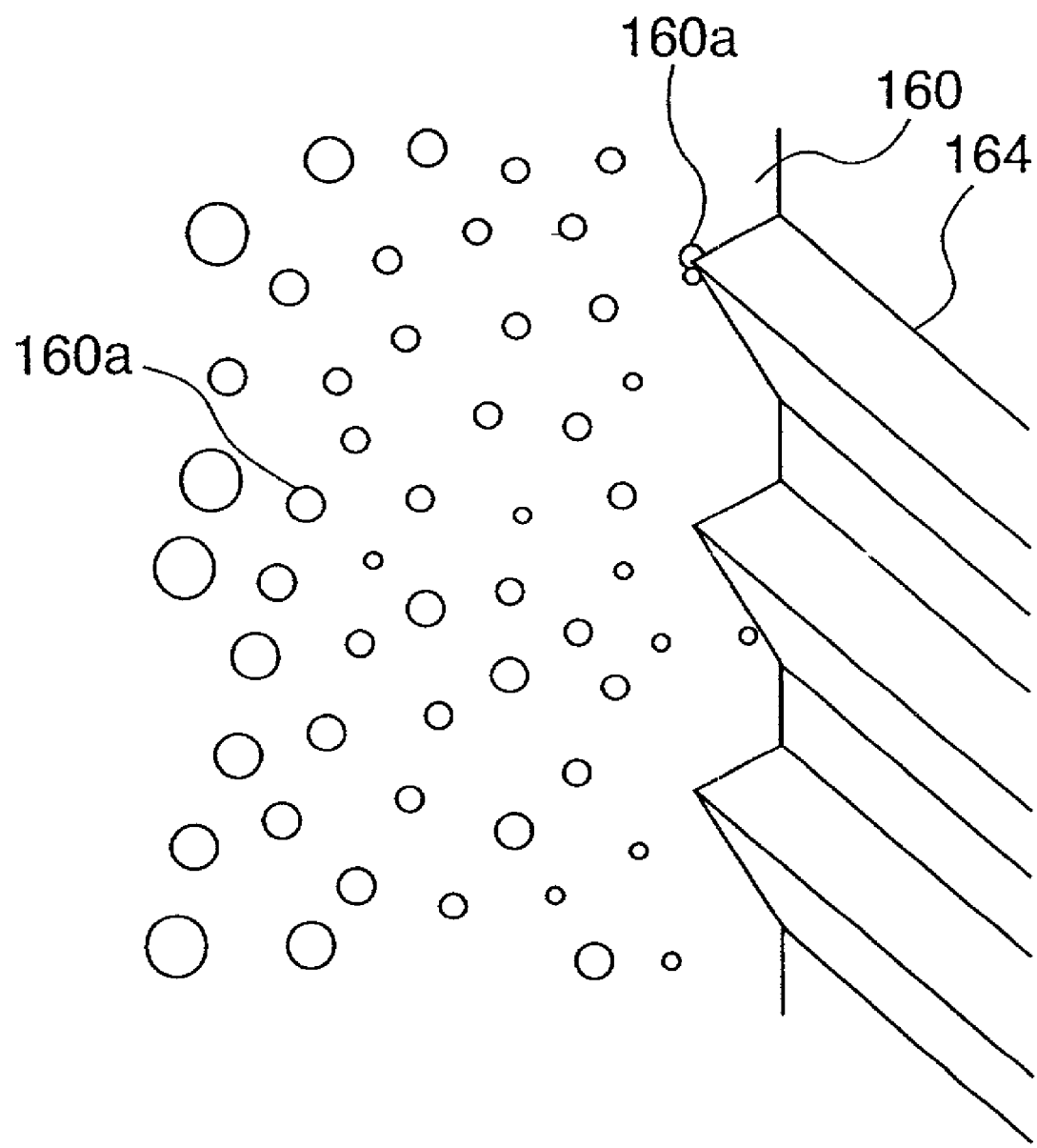
FIG. 24 is a view for explaining the antivibration effect of an antivibration member.
Figure 25:
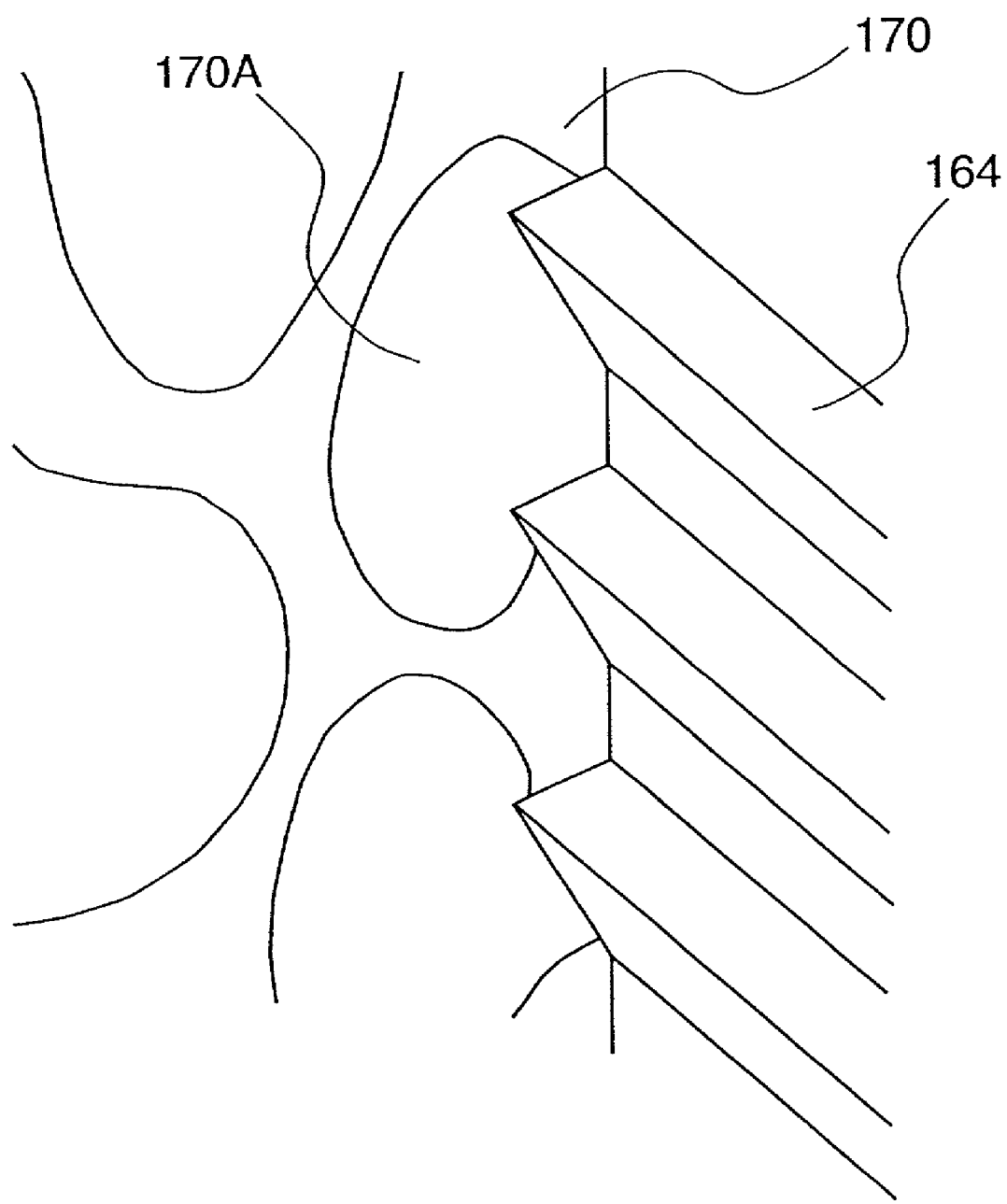
FIG. 25 is a view for explaining the antivibration effect of an antivibration member.

FIGS. 24 and 25 are schematic views for explaining the difference in antivibration effect between the antivibration member according to this embodiment and an antivibration member formed by conventional foam molding.

In a molded product 170 formed by conventional foam molding, as shown in FIG. 25, the diameter of a cell 170A is about 0.5 mm, which is much larger than a cell in this embodiment. If, therefore, a cell is broken by a screw member, the broken portion becomes a hollow, resulting in a great decrease in the coupling strength of the screw member.

As described with reference to FIGS. 15 and 16, the antivibration member 160 of this embodiment is designed such that many cells on the micron order are formed in a resin material for a resin molded product.

When a screw hole is formed in such an antivibration member formed by foam molding, and a screw member is threadably engaged with the screw hole as shown in FIG. 22, the male screw 164 breaks cells 160a in the process of entering the screw hole of the female thread, as shown in FIG. 24. However, since the sizes of cells in the resin molded product of this embodiment are defined within the range of 10 to 100 μm, resin material portions exist near the broken cells. This makes it possible to greatly suppress the influence of the broken cells on the coupling strength of the screw member.

As described above, the second to fifth embodiments can prevent signals and information output from a recording medium for audio equipment or video equipment from being affected by factors inside and outside the equipment.

In addition, according to the second to fifth embodiments, by defining the sizes of cells in a resin molded product within the range of 10 to 100 μm, the influence of breakage of cells by a screw member can be eliminated to obtain an antivibration effect.

(Sixth Embodiment)

In this embodiment, the present invention is applied to an image forming apparatus, and more specifically, a laser beam printer.

Figure 28:
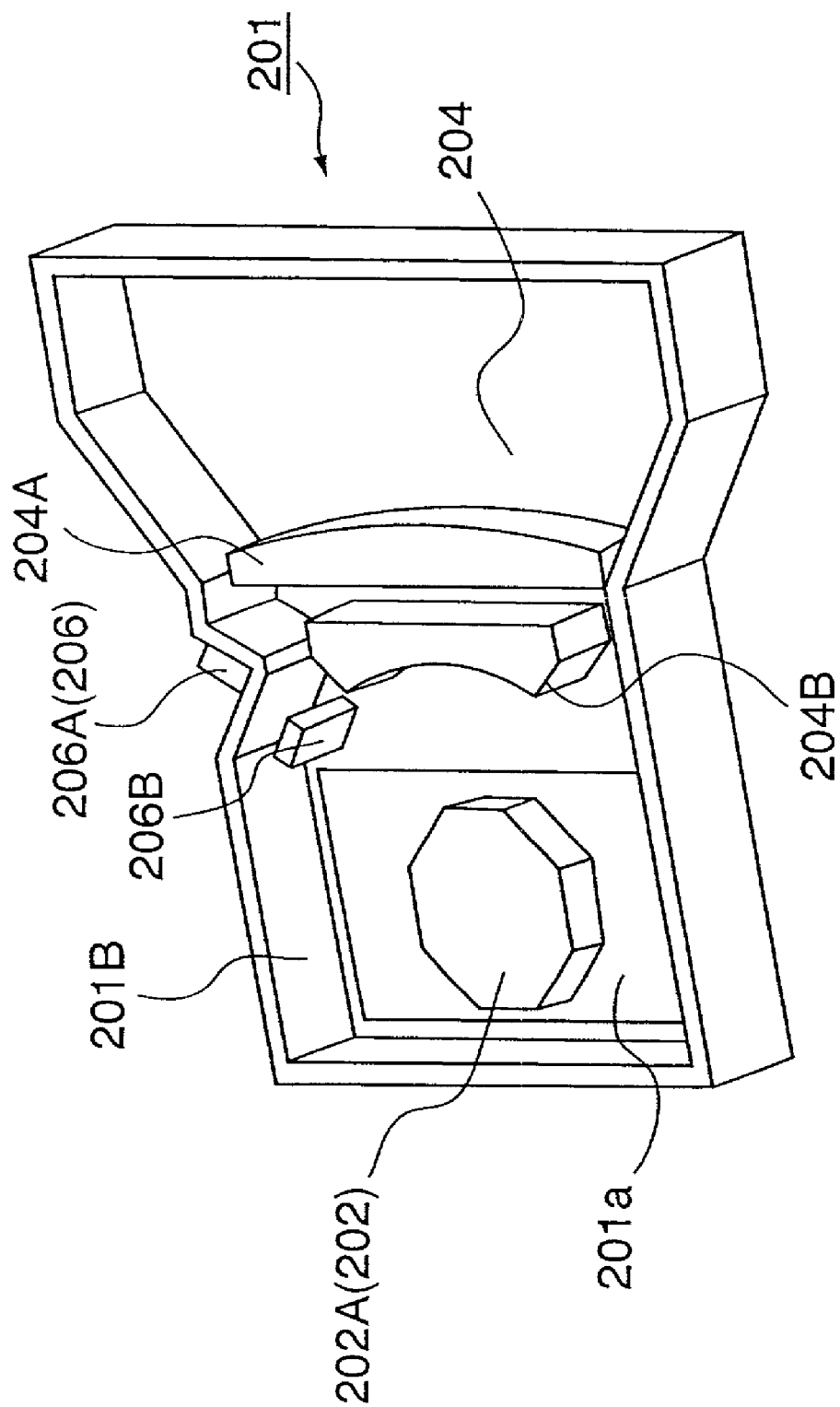
FIG. 28 is a perspective view of the main part of a molded product according to the sixth embodiment.

FIG. 28 is a perspective view of the main part of a mount member according to the present invention. In this embodiment, the mount member is a molded product formed by molding using a resin material, which is incorporated in a laser beam printer.

Figure 29:
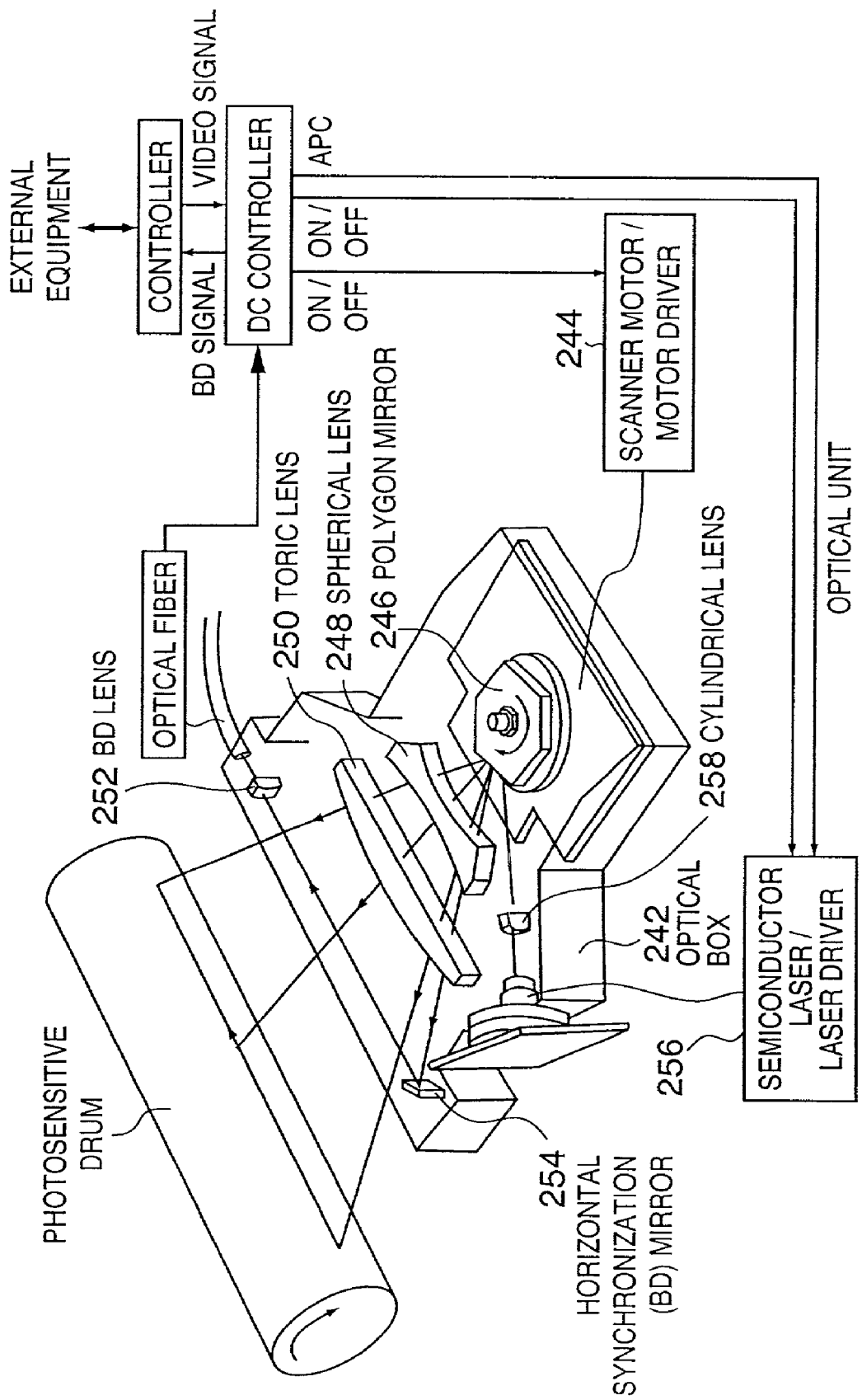
FIG. 29 is a view for explaining an image forming apparatus using the molded product according to the sixth embodiment.

FIG. 29 is a view showing the arrangement of parts and units mounted on a mount member which is a molded product according to the present invention.

A molded product 201 has a flat board portion 201A as a major constituent. A frame portion 201B is formed on the peripheral wall of the flat board portion to reinforce the molded product 201.

A first means 202 including a polygon mirror 202A is mounted on the flat board portion 201A.

The rotating shaft of a motor (not shown) is coupled to the rotating shaft of the polygon mirror. When the motor rotates, vibrations are generated by the first means 202.

Reference numeral 204 denotes a second means including a toric lens 204A and spherical lens 204B. Image information is scanned on a photosensitive drum surface by scanning the polygon mirror. The second means 204 is mounted on the surface of the molded product, and hence is influenced by vibrations from the first means.

Reference numeral 206 denotes an output means for outputting image information from a laser source. The output means is constituted by a laser light output fiber 206A, lens 206B, and the like.

The molded product 201 has the above parts and units (means) mounted thereon and is mounted at a predetermined position in the housing of the printer.

The parts and units shown in FIG. 29 are mounted on the flat board portion 201A of the molded product 201. The polygon mirror 202A shown in FIG. 29 is rotated at a high speed by a motor incorporated in the unit 202 to scan a latent image area (image transfer area) on the photosensitive drum Since the polygon mirror is rotated at a high speed, e.g., 45,000 rpm, by the motor, vibrations are generated at a portion near the support portion of the molded product 201 which supports the mirror.

The vibrations generated by the motor propagate on the flat board portion 201A and reach the laser source, toric lens, optical lens, and the like, thus affecting the formation of a latent image on the latent image forming portion of the photosensitive drum. As a consequence, the resolution of the transferred image decreases.

The vibrations generated upon rotation of the polygon mirror are transferred to the resin molded product 201 and further transferred to the lens and laser source through the resin molded product 201. If the vibrations cannot be damped by the resin molded product 201, the polygon mirror and resin molded product resonate, resulting in a deterioration in surface precision with respect to the laser optical axis of the polygon mirror. As a result, laser print positions deviate on the photosensitive drum, and print positions deviate, leading to a deterioration in print precision.

This embodiment is configured to prevent a deterioration in print precision due to the influence of vibrations from a vibration source such as the motor described above, and associated with a molded product made of a resin material, on which a first means including a vibration source object and a second means including a reception object for receiving signals from the vibration source object are mounted. More specifically, the above problem is solved by a molded product made of a resin material which is characterized in that damping function objects for damping the vibrations generated by the vibration source object are formed in the molded product in the molding process.

Figure 30:
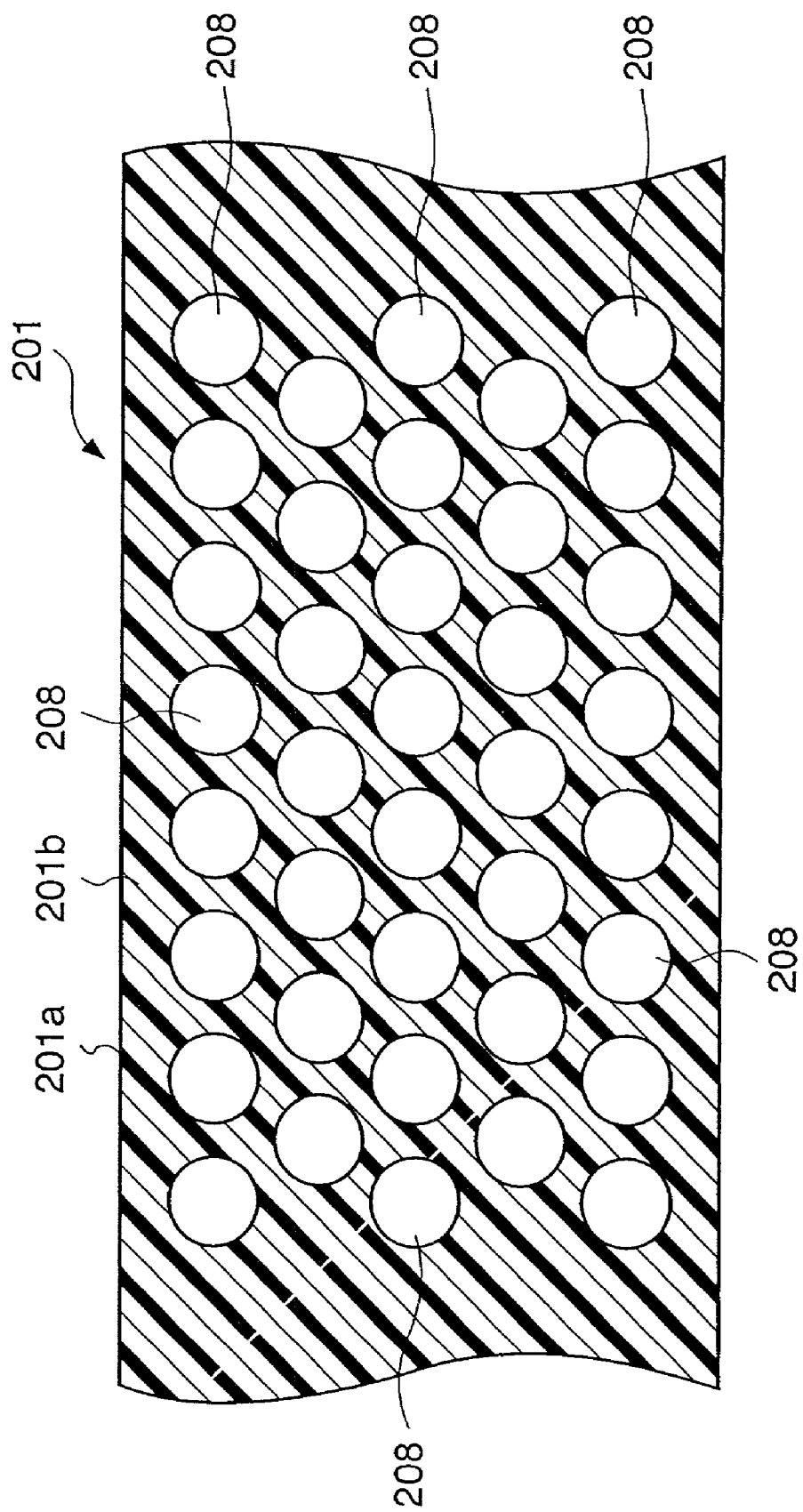
FIG. 30 is a schematic view for explaining a cross-sectional structure of the molded product according to the sixth embodiment.

FIG. 30 is a schematic sectional view of the board 201 molded by using a resin material according to this embodiment as a main component and forming vibration damping function objects in the resin material.

As shown in FIG. 30, in the board according to this embodiment, cells 208 serving as vibration damping function objects are formed in the molding resin material.

Reference numeral 201a denotes a board surface; 201b, a resin material portion; and 208, a cell. The diameter of the cell 208 falls within the range of 5 to 100 μm.

(First Example of Molded Product)

Figure 31:
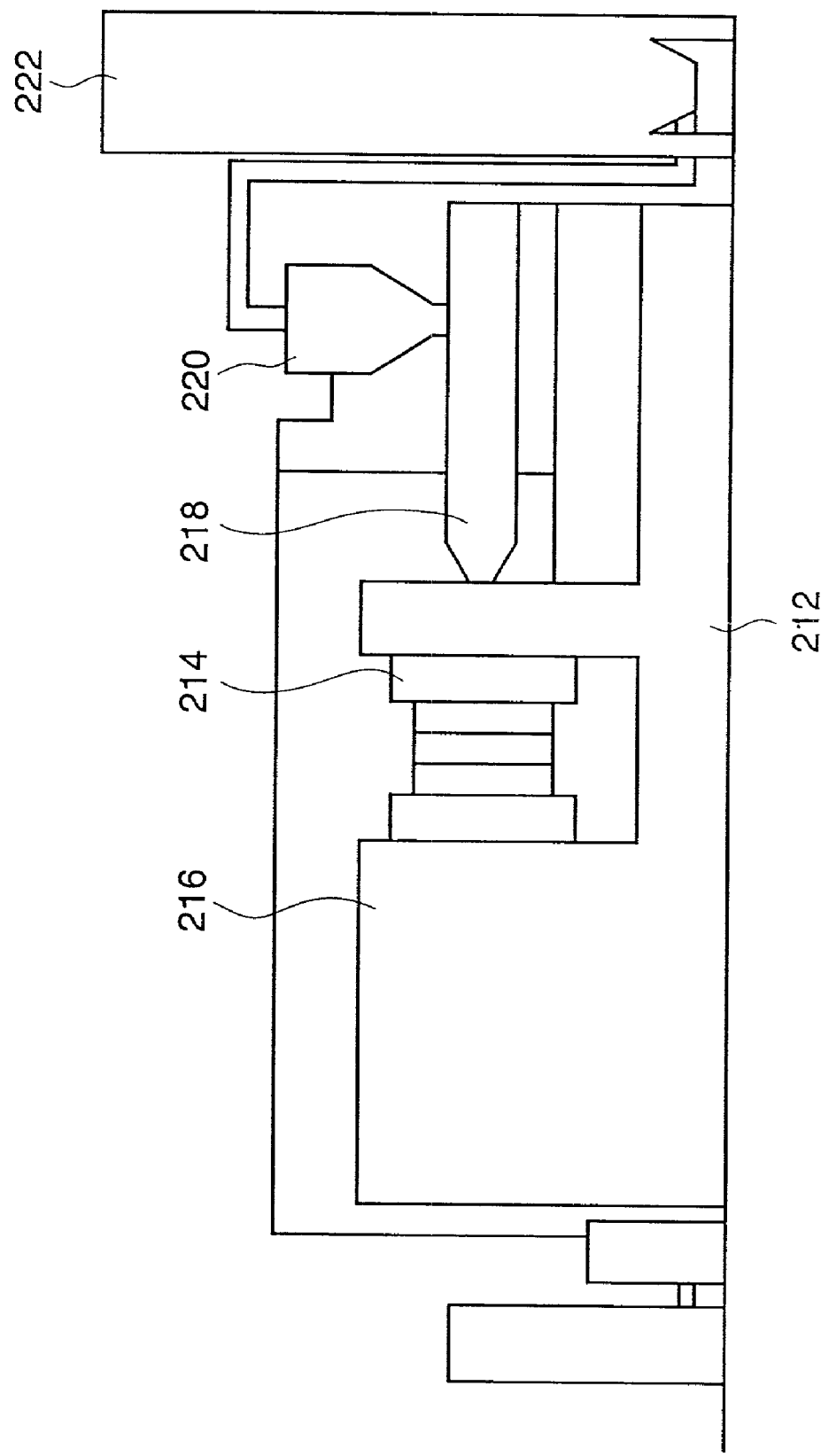
FIG. 31 is a view for explaining a manufacturing method and apparatus for the molded product according to the sixth embodiment.

A molded product was formed by the molding apparatus shown in FIG. 31 using polyphenylene oxide (PPO) as a resin material and carbon dioxide gas ($CO_2$) as a foaming material.

The diameters of cells were about 10 to 25 μm.

The approximate dimensions of the molded product 201 were:

length L1=170 mm width B1=150 mm thickness of frame portion=2.5 mm, height=20 mm distance from central position of rotating shaft of motor as vibration source to lens 204B=50 mm distance from central position of rotating shaft of motor as vibration source to lens 206B=45 mm FIG. 33 is a table showing comparisons in vibration damping factor and flexural rigidity between the molded product 201 and a molded product as a comparative example which was formed by the conventional molding method using the same resin material, i.e., PPO, without containing any cells 208. The dimensions of the respective portions of these molded products and the units arranged thereon were the same.

A manufacturing method and apparatus for the first example of the molded product will be described next with reference to FIG. 31.

Referring to FIG. 31, reference numeral 212 denotes a molding apparatus body; 214, a mold portion; 216, a locking portion; 218, a plasticizing portion; 220, a hopper; 222, a resin material feed portion; 224, a damping function member feed means; 224A, a damping function member feed path; and 226, a control means.

The mold portion 214 has a cavity surface identical to the molded structure of the molded product 201.

In this case, carbon dioxide gas ($CO_2$) was used as a damping function member.

Polyphenylene oxide (PPO) which an inert gas of a supercritical pressure or less has permeated at a temperature equal to or lower than the thermal deformation temperature of the resin material is fed to the resin material feed portion 222 and then fed to the hopper 220. This material is further fed to the plasticizing portion 218 to be heated and plasticized.

In the plasticizing portion 218, the polyphenylene oxide (PPO) which the inert gas has permeated is melted and kneaded.

A mixture of the resin material heated to the plasticizing temperature and the gas is injected from the plasticizing portion 218 into the cavity in the mold portion 214.

A predetermined amount of mixture of resin material and gas is foamed with a change in pressure when it is charged into the mold. The gas causes foaming before the resin completely solidifies, thus compensating for a change in the volume of this mixture due to escaping of heat of the resin material to the mold and contraction upon cooling.

The sizes of cells formed from the gas vary depending on conditions such as the pressure with which the gas is injected into the resin material, the amount of gas injected, the injection pressure of the resin material, the injection speed, the amount of material injected, the holding pressure, the holding pressure time, the cooling gradient of the mold, and the cooling time.

In the case of the first example of the molded product, when the molded products 201 obtained by molding under the above conditions were cut, and cells in the sectional structures were measured, the average diameters of cells of the two structures were 10 μm and 20 μm, respectively.

With a higher injection speed, a larger filling amount, a higher injection pressure, a higher holding pressure, a lower mold temperature, and a larger cooling gradient, the cells in the molded product decreased in size.

When the molded product 201 as an example with PPO as a resin material and a cell diameter of 20 μwas used as a board for the above laser beam printer, the weight of the resin material could be reduced by 25% as compared with the prior art, as shown in FIG. 33.

With respect to a vibration frequency of 120 dB/sec at a position near the above vibration source, the vibration frequency at a position near the lens 204B of the vibration reception means is 62 dB/sec. As shown in FIG. 34, the vibration damping factor is 58 dB/sec. In addition, a decrease in flexural rigidity of the first example 1 of the molded product as a board due to the formation of cells falls within 15% as compared with a conventional molded product without any cells.

This decrease of 15% in flexural rigidity exerted no influence on the function of a product because a flexural rigidity equal to or higher than the minimum necessary flexural rigidity, 4,000 MPa, that affects print precision could be ensured.

Figure 32:
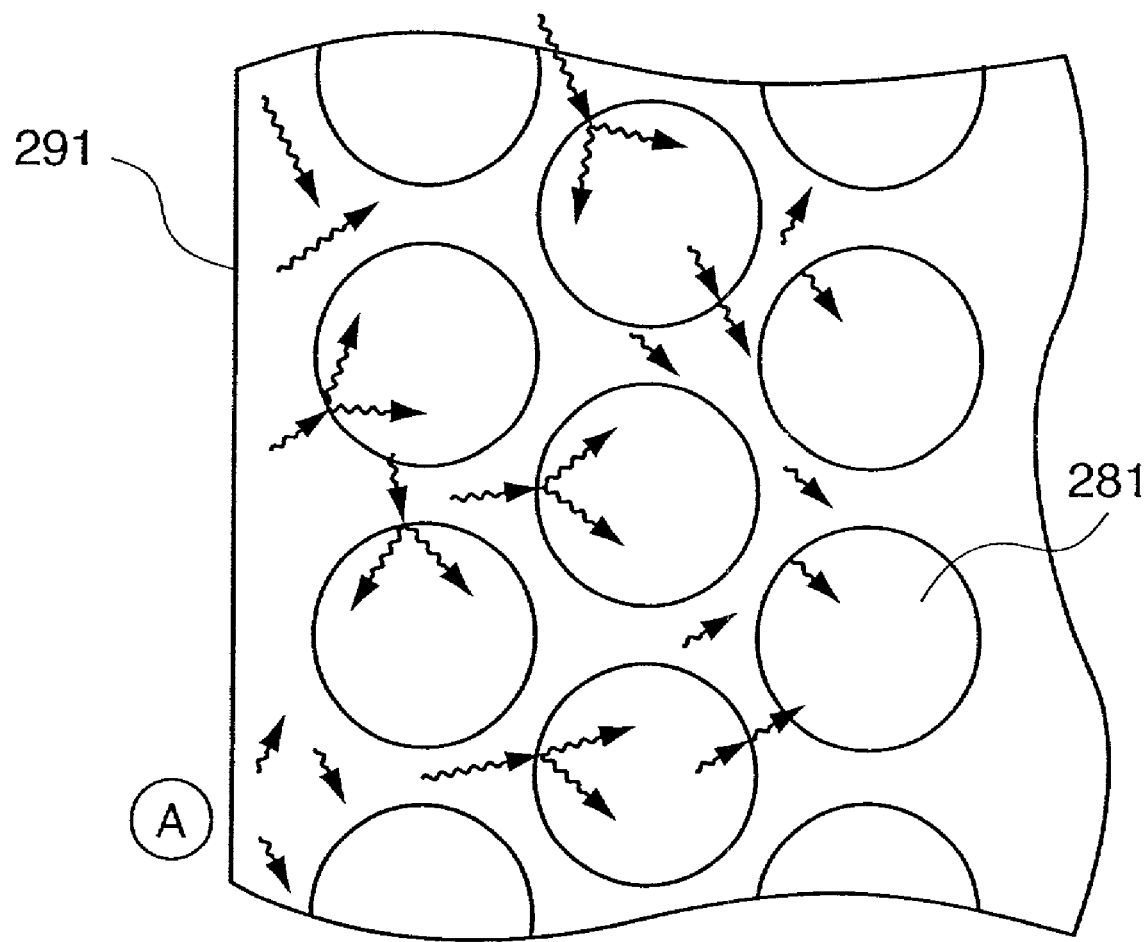
FIG. 32 is a view for explaining the vibration damping effect of the molded product according to the sixth embodiment.

FIG. 32 is a schematic view for explaining the vibration damping effect of a molded product according to this embodiment.

As shown in FIG. 28, a molded product according to this embodiment is used as a board, and the parts and units described above are arranged on the board. This board is mounted in the housing of a laser beam printer. When the printer is started, the vibrations generated by the rotational motions of the motor and polygon mirror propagate to the molded product near the motor shaft.

Referring to FIG. 32, when the motor shaft is located at a point A in FIG. 32, the vibrations propagate through the resin material. Owing to the presence of cells 208 in the resin, however, the vibrations are damped when they reach the cells.

The vibrations damped by the cells near the point A propagate in the resin molded product while being damped. In the process of propagation, however, the vibrations are sequentially and continuously damped by cells in the resin. As a consequence, the vibrations from the vibration source are considerably damped before they reach the position of the lens of the signal reception member.

As shown in FIGS. 33 and 34, the present inventor made studies using various resin materials other than PPO:
  PC: polycarbonate resin material
  ABS: acrylonitrile-butadiene-styrene copolymer
  HIPS: High Impact Polystyrene
  PC/ABS: alloyed resin material of PC and ABS
  PC/ABS (mixed with fiber)
  PPO (mixed with fiber)

and obtained the data shown in FIGS. 33 and 34.

As described above, the sixth embodiment includes a molded product made of a resin material on which a first means including a vibration source object and a second means including a reception object for receiving signals from the vibration source object are mounted. This molded product is characterized in that damping function objects for damping vibrations from the vibration source object are formed in the molded product in the molding process. Since the obtained molded product exhibits a high damping effect with respect to vibrations and can be used in a wide application range, this product can be effectively used as an antivibration means for various devices.

In addition, if the vibration source object is a rotating member, its application range can be extended.

Likewise, if the reception object is an optical element, its application range can be extended.

If the molded product is a housing in which the above object incorporated in electrical equipment is mounted, the molded product can effectively serve as an antivibration means.

Since the damping function objects are a gas, the moldability of the resin material is not impaired.

The sixth embodiment includes a molded product made of a resin material which holds a rotating member for receiving information from an information source and transferring it to an information reception object and the reception object for receiving the information from the rotating member on a mount surface while maintaining their optical positional relationship. This molded product is characterized in that damping function objects for damping the vibrations generated by the rotating member are formed in the molded product. This improves the practicability for precision equipment.

If the information from the information source is a signal using laser light, the information processing performance can be improved.

Furthermore, the sixth embodiment includes a mount member on which a transfer means for transferring a signal from a signal generating means for generating image information to an optical element upon rotation. This mount member is characterized in that the mount member is molded by using a resin material, and a functional portion for damping vibrations is molded together in the molding process. This allows the mount member to be used for an image forming apparatus.

As is obvious from FIGS. 33 and 34, the present invention can provide an arrangement for reducing the amount of resin material used and preventing a decrease in mechanical strength with a decrease in the amount of resin material used.

Consider recycling of equipment using the molded product according to the sixth embodiment. This molded product is suitable for recycling because no foreign material is mixed into the resin material.

In addition, since a foamed state is adjusted such that the vibration damping factor between the position of the image transfer means and the position of the image reception means was set to 35 dB/sec or more, the print precision could be increased.

Furthermore, since the flexural rigidity fell in the range of 4,500 to 9,800 MPa, the deformation of the molded product which was caused when it was fixed with a screw could be suppressed to about 5 µm.

Moreover, the deformation of the molded product under a high-temperature, high-humidity condition and a low-temperature, low-humidity condition was greatly suppressed.

The present invention is not limited to the above embodiments and various changes and modifications can be made within the spirit and scope of the present invention. Therefore, to apprise the public of the scope of the present invention the following claims are made.

What is claimed is:

1. An anti-vibration device comprising:
   first means including a vibration source object;
   second means including a reception object for receiving a signal from the vibration source object; and
   a molded product comprising gas-cells having a size from 10 to 100 µm,
   wherein the first means and the second means are arranged on the molded product,
   wherein a damping factor of the molded product between the first means and the second means is not less than 35 dB/sec, and
   wherein a flexural rigidity of the molded product is from 4,500 to 9,800 Mpa.

2. The molded product anti-vibration device according to claim 1, wherein the vibration source object comprises a rotating member.

3. The anti-vibration device according to claim 1, wherein the reception object comprises an optical element.

4. The anti-vibration device according to claim 1, wherein the molded product comprises a housing in which the object incorporated in electric equipment is mounted.

5. A method of manufacturing an anti-vibration device, which dampens a vibration between a first means including a vibration source object and a second means including a reception object for receiving a signal from the vibration source object, the method comprising the steps of:
   saturating a resin material with an inert gas by adjusting a pressure and an amount of the inert gas;
   molding a molded product in which a number, shapes and sizes of gas-cells are adjusted by controlling an injection pressure, an injection speed, an injection amount, a holding pressure, a cooling gradient of a mold, and a cooling time and injecting the resin material into the mold; and
   mounting the first means and the second means to the molded product.

6. The method according to claim 5, wherein the vibration source object comprises a rotating member.

7. The method according to claim 5, wherein the reception object comprises an optical element.

8. The method according to claim 5, wherein the molded product comprises a housing in which the object incorporated in electric equipment is mounted.

9. The method according to claim 5, wherein injection molding is performed by using resin pellets, wherein an inert gas of not more than a supercritical pressure is permeated in advance at a temperature not more than a thermal deformation temperature of the resin material.

* * * * *

UNITED STATES PATENT AND TRADEMARK OFFICE
CERTIFICATE OF CORRECTION

| | | |
|---|---|---|
| PATENT NO. | : 7,107,601 B2 | |
| APPLICATION NO. | : 09/877092 | |
| DATED | : September 12, 2006 | |
| INVENTOR(S) | : Takashi Arai | |

It is certified that error appears in the above-identified patent and that said Letters Patent is hereby corrected as shown below:

SHEET 9

FIG. 9, "FORM" should read --FOAM--.

SHEET 35

FIG. 34, "ELEXURAL" (both occurrences) should read --FLEXURAL--.

COLUMN 2

Line 11, "in" should read --at--; and
    Line 17, "developed" should read --developed at--.

COLUMN 3

Line 32, "in" should be deleted.

COLUMN 4

Line 3, "use" should read --uses--.

COLUMN 5

Line 38, "characterized in that" (second occurrence) should be deleted.

COLUMN 13

Line 46, "andisconnected" should read --and is connected--; and
    Line 57, "is" should read --are--.

COLUMN 14

Line 18, "bubble" should read --bubbled--; and
    Line 53, "no" should read --not--.

COLUMN 15

Line 8, "andiscontrolled" should read --and is controlled--.

UNITED STATES PATENT AND TRADEMARK OFFICE
CERTIFICATE OF CORRECTION

| | |
|---|---|
| PATENT NO. | : 7,107,601 B2 |
| APPLICATION NO. | : 09/877092 |
| DATED | : September 12, 2006 |
| INVENTOR(S) | : Takashi Arai |

It is certified that error appears in the above-identified patent and that said Letters Patent is hereby corrected as shown below:

COLUMN 16

Line 1, "andiscon-" should read --and is con- --; and
    Line 4, "andiscompletely" should read --and is completely--.

COLUMN 20

Line 62, "diameter" should read --diameter of--.

COLUMN 22

Line 63, "drum" should read --drum.--; and
    Line 64, "Since" should read -- ¶ Since--.

COLUMN 24

Line 45, "20 μwas" should read --20 μm was--.

COLUMN 25

Line 47, "a gas," should read --gasses,--.

COLUMN 26

Line 45, claim 2 "molded product" should be deleted; and
    Line 52, claim 4 "electric" should read --electrical--.

UNITED STATES PATENT AND TRADEMARK OFFICE
CERTIFICATE OF CORRECTION

PATENT NO. : 7,107,601 B2
APPLICATION NO. : 09/877092
DATED : September 12, 2006
INVENTOR(S) : Takashi Arai It is certified that error appears in the above-identified patent and that said Letters Patent is hereby corrected as shown below:

<u>COLUMN 27</u>

Line 7, "electric" should read --electrical--.

Signed and Sealed this

Twentieth Day of March, 2007

JON W. DUDAS
*Director of the United States Patent and Trademark Office*